(12) United States Patent
Na'aman et al.

(10) Patent No.: US 10,935,779 B2
(45) Date of Patent: Mar. 2, 2021

(54) DIGITAL MICROSCOPE WHICH OPERATES AS A SERVER

(71) Applicant: SCOPIO LABS LTD., Tel Aviv (IL)

(72) Inventors: Erez Na'aman, Tel Aviv (IL); Michael Shimon Iluz, Tel Aviv (IL); Itai Hayut, Tel Aviv (IL)

(73) Assignee: Scopio Labs Ltd., Tel Aviv (IL)

( * ) Notice: Subject to any disclaimer, the term of this patent is extended or adjusted under 35 U.S.C. 154(b) by 0 days.

(21) Appl. No.: 16/338,674

(22) PCT Filed: Oct. 26, 2017

(86) PCT No.: PCT/IB2017/001454
§ 371 (c)(1),
(2) Date: Apr. 1, 2019

(87) PCT Pub. No.: WO2018/078447
PCT Pub. Date: May 3, 2018

(65) Prior Publication Data
US 2020/0041780 A1 Feb. 6, 2020

Related U.S. Application Data

(60) Provisional application No. 62/413,716, filed on Oct. 27, 2016.

(51) Int. Cl.
*G02B 21/36* (2006.01)
*G06T 7/11* (2017.01)
(Continued)

(52) U.S. Cl.
CPC ......... *G02B 21/367* (2013.01); *G02B 21/008* (2013.01); *G02B 21/0072* (2013.01);
(Continued)

(58) Field of Classification Search
CPC .. G02B 21/00; G02B 21/0072; G02B 21/008; G02B 21/36; G02B 21/365;
(Continued)

(56) References Cited

U.S. PATENT DOCUMENTS

| 6,101,265 A | 8/2000 | Bacus et al. |
| 6,226,392 B1 | 5/2001 | Bacus et al. |

(Continued)

FOREIGN PATENT DOCUMENTS

WO  WO-2018078447 A1  5/2018

OTHER PUBLICATIONS

PCT/IB2017001454 International Search Report and Written Opinion dated Mar. 12, 2018.

*Primary Examiner* — Thai Q Tran
*Assistant Examiner* — Stephen R Smith
(74) *Attorney, Agent, or Firm* — Wilson Sonsini Goodrich & Rosati

(57) ABSTRACT

Access to microscope images while a sample is scanned or images are generated or uploaded can decrease an amount of time that a user waits to view a region of interest of an image. A processor can be configured to allow a remote user to access a portion of an image at full or partial resolution while other portions of the sample are being scanned, or while one or more images are generated or uploaded at full or partial resolution. A processor stored locally with the microscope can be configured to allow a remote user to access a completed scan over the internet prior to the scan being fully uploaded over a network such as the internet to a remote server. In some embodiments, a processor may be coupled to a microscope, a user device, or a remote server.

20 Claims, 13 Drawing Sheets

(51) Int. Cl.
*G06F 16/955* (2019.01)
*G02B 21/00* (2006.01)
(52) U.S. Cl.
CPC .............. *G06F 16/955* (2019.01); *G06T 7/11* (2017.01); *G06T 2207/20104* (2013.01)
(58) Field of Classification Search
CPC ................ G02B 21/367; G06F 16/955; G06T 2207/20104; G06T 7/11
USPC .................... 348/79; 250/307; 382/128, 133
See application file for complete search history.

(56) References Cited

U.S. PATENT DOCUMENTS

| | | | |
|---|---|---|---|
| 6,424,996 B1 * | 7/2002 | Killcommons | G06Q 50/22 709/206 |
| 7,292,251 B1 * | 11/2007 | Gu | G02B 21/367 345/555 |
| 8,866,063 B2 | 10/2014 | Ozcan et al. | |
| 2004/0218804 A1 * | 11/2004 | Affleck | G02B 21/0016 382/141 |
| 2004/0252875 A1 | 12/2004 | Crandall et al. | |
| 2011/0317891 A1 * | 12/2011 | Kajimoto | G06F 16/51 382/128 |
| 2012/0011194 A1 * | 1/2012 | Tahan | G06F 3/0481 709/203 |
| 2014/0044327 A1 | 2/2014 | Eichhorn et al. | |
| 2014/0118529 A1 | 5/2014 | Zheng et al. | |
| 2015/0371815 A1 * | 12/2015 | Potocek | H01J 37/28 250/307 |
| 2016/0013015 A1 * | 1/2016 | Potocek | H01J 37/28 250/307 |
| 2017/0220000 A1 * | 8/2017 | Ozcan | H04N 5/23238 |

* cited by examiner

DIGITAL MICROSCOPE WHICH OPERATES AS A SERVER

CROSS-REFERENCE

This application is a national phase entry under 35 U.S.C. § 371 of PCT Application No. PCT/IB2017/001454, filed on Oct. 26, 2017, which claims priority to U.S. Prov. App. Ser. No. 62/413,716, filed on Oct. 27, 2016, entitled "DIGITAL MICROSCOPE WHICH ACTS AS A SERVER", the entire disclosure of each of which are incorporated herein by reference.

BACKGROUND

Prior methods and apparatus for accessing image data from microscopes and scanners can be less than ideal. In at least some instances there can be significant delays between the time when a scan is initiated and the image of an object such as a microscope slide is available for analysis. For example, with high resolution microscopy, relatively large areas are scanned at high resolution-over an area that is significantly larger than the field of view of the microscope. The amount of data generated with such scans can exceed 100 megabytes (MB) and in some instances 1 gigabyte (GB), and the amount of time required to generate the data can exceed several minutes. In some instances, image data from an object that has been partially scanned may not be readily available to a user during the scanning process. Also, completed scans of an object may not be available for viewing in at least some instances. Also, uploading large microscope image files to a remote server for access from the remote server can take several minutes or longer. The prior methods and apparatus are less than ideally suited to allow remote access to data from a large image file for an object while the object is being scanned and uploaded. These delays can result in increased amounts of time to analyze the image of the sample, and can also lead to less than ideal utilization of resources. For example, a determination of a cell type or other analysis can take longer than would be ideal, and the user of the system may have down time while waiting for completion of the image of the object being scanned. These limitations of the prior art can be especially challenging with digital microscopy where additional computation time is utilized to generate images such as high resolution images over relatively large fields of view, because of the additional time utilized to generate the images with digital processing.

In light of the above, it would be desirable to have improved access to a partial image while remaining portions of the image are being scanned, and also to completed scans of an object. Ideally such methods and apparatus would allow a user to access the completed portion of the image while additional regions of the image are being imaged or processed, and also to allow access to completed images.

SUMMARY

The presently disclosed methods and apparatus provide improved access to microscope images while a sample is scanned or images are generated or uploaded so as to decrease an amount of time that a user waits to view a region of interest of an image. A processor can be configured to allow a remote user to access a portion of an image at full or partial resolution while other portions of the sample are being scanned, or while one or more images are generated or uploaded at full or partial resolution. Alternatively or in combination, the processor stored locally with the microscope can be configured to allow a remote user to access a completed scan over the internet prior to the scan being fully uploaded over a network such as the internet to a remote server. In some embodiments, a processor may be coupled to a microscope, a user device, or a remote server. In some embodiments, a low resolution image of the sample or a portion thereof is shown on a display to a user, and the user can select a region of interest of the low resolution image to view at higher resolution. The user can view the region of interest at higher resolution while the remainder of the image is generated or uploaded at full resolution. In some embodiments, the scanning of the image is decoupled from the selected region of interest in order to allow scanning of the sample or a portion thereof to continue while a user views a region of interest at the higher resolution. The processor may comprise a server configured to allow the user to view the regions of interest. The server may comprise a server located near the microscope or a remote server, or both.

In one aspect, the present disclosure provides a microscope comprising an optical apparatus, an imaging device coupled to the optical apparatus, and a processor comprising a storage medium coupled to the imaging device. In some embodiments, the processor is configured with instructions to transmit a first image stored in the storage medium to a display visible to a user, the first image corresponding to a completed portion of an image of the sample; receive input corresponding to a user-selected region of interest in response to the first image; and transmit a second image corresponding to the completed portion of the image of the sample to the display visible to the user. In some embodiments, the second image comprises an image of the user-selected region of interest of the completed portion stored in the storage medium.

In some embodiments, the user-selected region of interest may correspond to a portion of the first image. The region of interest may comprise a region of the completed portion not fully shown in the first image.

In some embodiments, the first image comprises a low resolution image. The second image may comprise a resolution higher than that of the first image. For example, the resolution of the second image higher than that of the first image may be within a range from about 2 times to about 100 times the resolution of the first image.

In some embodiments, the input corresponding to the user-selected region of interest further comprises input corresponding to a user-selected zoom level, magnification, or resolution of the region of interest. The input may further comprise input corresponding to a user-selected color scheme, contrast, or brightness.

In some embodiments, the completed portion corresponds to an entire pre-defined area of the sample.

In some embodiments, the microscope comprises a computational microscope. A computational microscope may be configured to illuminate the sample with a plurality of illumination conditions to capture a plurality of images and generate a portion of the completed portion of the image of the sample based on the plurality of images. The portion of the completed portion of the image of the sample may correspond to a field of view of the optical apparatus and the imaging device.

In some embodiments, the first image and the second image are transferred to the display visible to the user via a network server. The network server does not have the completed portion of the image of the sample stored in its storage medium when the first image and the second image are transferred to the display.

In some embodiments, the completed portion of the image of the sample comprises an image of a part of the sample defined to be scanned with the instructions stored on the processor.

In some embodiments, the first image and the second image do not comprise an entire set of full resolution images of the completed portion.

In some embodiments, the instructions are configured to allow the user to access the image of the sample through a link which remains valid even when the image of the sample is transferred between the storage medium coupled to the processor and a storage medium coupled to the network server. The instructions may be configured to allow the user to access the completed portion of the image of the sample prior to completion. The link may comprise an internet uniform resource locator (URL) or internet protocol (IP) address.

In some embodiments, the link provides the first image using a dedicated system resource and allows the user to select the region of interest in response to the first image, and the processor comprises instructions to transmit the second image without transferring all of the completed portion of the image of the sample. The user input may point to a location of the completed portion of the image of the sample, and the first image may comprise a thumbnail of the completed portion of the image of the sample.

In some embodiments, the processor is configured with instructions for local and remote users to provide annotations to the completed portion, and the processor is configured with instructions for the local and remote users to view the annotations to the completed portion of the image of the sample. The processor may be configured to allow the local and remote users to provide and view the annotations prior to completion of the image of the sample.

In some embodiments, the image of the sample comprises a high resolution image of the sample based on low resolution images captured using different illumination conditions.

In some embodiments, the different illumination conditions are selected from the group consisting of different illumination angles, different illumination wavelengths, different illumination patterns, different illumination durations, different illumination intensities, and different illumination positions.

In some embodiments, the completed portion of the image of the sample is based on images captured according to a predetermined pattern.

In some embodiments, the predetermined pattern is selected from the group consisting of a line-scanning pattern, a snake-scanning pattern, and a spiral-scanning pattern.

In some embodiments, the processor is configured with instructions to receive image data from the microscope and construct the completed portion of the image of the sample.

In some embodiments, the input corresponding to the user-selected region of interest is received prior to completion of construction of the image of the sample.

In some embodiments, the processor is configured with instructions to receive input to suspend, abort, or alter construction of the image of the sample prior to completion.

In some embodiments, the second image is transmitted prior to completion of the construction of the image of the sample.

In some embodiments, the processor is configured with instructions to: receive a plurality of inputs corresponding to a plurality of user-selected regions of interest of the completed portion of the partially completed high resolution image of the sample and transmit a plurality of high resolution images of the plurality of user-selected regions of interest.

In some embodiments, the processor is configured with instructions to: update the completed portion of the image of the sample in response to image data from the imaging device so as to generate a plurality of successively completed portions of the image of the sample over time; transmit a plurality of successive first images of the plurality of successively completed portions to the display visible to the user; receive a plurality of successive user inputs corresponding to a plurality of successive user-selected regions of interest from the plurality of successive first images; and transmit to the display a plurality of successive second images of the plurality of successive user-selected regions of interest. The plurality of successive first images may be transmitted over time, and the plurality of successive second images may be transmitted over time.

In some embodiments, the processor is configured with instructions to: update the completed portion in response to image data from the imaging device so as to generate a plurality of successively completed portions of the image of the sample over time; transmit a plurality of successive low resolution images of the plurality of successively completed portions to the display visible to the user; receive a plurality of successive user inputs corresponding to a plurality of successive user-selected regions of interest from the plurality of successive low resolution images; and transmit to the display a plurality of successive high resolution images of the plurality of successive user-selected regions of interest. The plurality of successive low resolution images may be transmitted over time, and the plurality of successive high resolution images may be transmitted over time.

In some embodiments, the completed portion of the image is locally stored. The completed portion and the imaging device may be locally stored within a shared building.

In some embodiments, the second image corresponding to the completed portion is transmitted to the display visible to the user over a network.

In some embodiments, the optical apparatus is selected from the group consisting of a microscope, a computational microscope, and a holographic imaging apparatus. In some embodiments, the imaging device comprises an image sensor selected from the group consisting of a semiconductor charge-coupled device (CCD), active pixel sensors in complementary metal-oxide-semiconductor (CMOS), and N-type metal-oxide-semiconductor (NMOS) sensors.

In some embodiments, the first image and the second image are transmitted over an internet to the display visible to the user.

In some embodiments, the processor comprises a plurality of processors. The processor may comprise a local processor coupled to the microscope and a remote server.

In some embodiments, the processor comprises a local processor.

In some embodiments, the processor comprises a remote server.

In some embodiments, the processor comprises instructions to send images of a plurality of regions which are adjacent to the first or second image automatically to the remote server or the user display and optionally to the remote server and the user display.

In another aspect, the present disclosure provides a server comprising a processor comprising a storage medium configured with instructions to transmit a first image stored in the storage medium to a display visible to a user, the first image corresponding to a completed portion of an image of a sample; receive input corresponding to a user-selected region of interest in response to the first image; and transmit a second image corresponding to the completed portion of the image of the sample to a display visible to the user, wherein the second image comprises an image of the user-selected region of interest of the completed portion stored in the storage medium.

In some embodiments, the user-selected region of interest may correspond to a portion of the first image. The region of interest may comprise a region of the completed portion not fully shown in the first image.

In some embodiments, the first image comprises a low resolution image. The second image may comprise a resolution higher than that of the first image. For example, the resolution of the second image higher than that of the first image may be within a range from about 2 times to about 100 times the resolution of the first image.

In some embodiments, the input corresponding to a user-selected region of interest further comprises input corresponding to a user-selected zoom level, magnification, or resolution of the region of interest. The input may further comprise input corresponding to a user-selected color scheme, contrast, or brightness.

In some embodiments, the completed portion corresponds to an entire pre-defined area of the sample.

In some embodiments, the first image and the second image are transferred to the display visible to the user via a network server. The network server does not have the completed image of the sample stored in its storage medium when the first image and the second image are transferred to the display.

In some embodiments, the completed image of the sample comprises an image of a part of the sample defined to be scanned with the instructions stored on the processor.

In some embodiments, the first image and the second image do not comprise an entire set of full resolution images of the completed portion.

In some embodiments, the instructions are configured to allow the user to access the image of the sample through a link which remains valid even when an image of the sample is transferred between the storage medium of the processor and a storage medium of the network server. The instructions may be configured to allow the user to access the completed portion prior to completion of the image of the sample. The link may comprise an internet uniform resource locator (URL) or internet protocol (IP) address.

In some embodiments, the link provides the first image using a dedicated system resource and allows the user to select the region of interest in response to the first image, and the processor comprises instructions to transmit the second image without transferring all of the completed portion of the image of the sample. The user input may point to a location of the completed portion of the image of the sample, and the first image may comprise a thumbnail of the completed portion of the image of the sample.

In some embodiments, the processor is configured with instructions for local and remote users to provide annotations to the completed portion, and the processor is configured with instructions for the local and remote users to view the annotations to the completed portion. The processor may be configured to allow the local and remote users to provide and view the annotations prior to completion of the image of the sample.

In some embodiments, the image of the sample comprises a high resolution image of the sample based on low resolution images captured using different illumination conditions.

In some embodiments, the different illumination conditions are selected from the group consisting of different illumination angles, different illumination wavelengths, different illumination patterns, different illumination durations, different illumination intensities, and different illumination positions.

In some embodiments, the completed portion of the image of the sample is based on images captured according to a predetermined pattern.

In some embodiments, the predetermined pattern is selected from the group consisting of a line-scanning pattern, a snake-scanning pattern, and a spiral-scanning pattern.

In some embodiments, the processor is configured with instructions to receive image data from the microscope and construct the completed portion of the image of the sample.

In some embodiments, the input corresponding to the user-selected region of interest is received prior to completion of construction of the image of the sample.

In some embodiments, the processor is configured with instructions to receive input to suspend, abort, or alter construction of the image of the sample prior to completion.

In some embodiments, the second image is transmitted prior to completion of the construction of the image of the sample.

In some embodiments, the processor is configured with instructions to: receive a plurality of inputs corresponding to a plurality of user-selected regions of interest of the completed portion of the partially completed high resolution image of the sample and transmit a plurality of high resolution images of the plurality of user-selected regions of interest.

In some embodiments, the processor is configured with instructions to: update the completed portion of the image of the sample in response to image data from the imaging device so as to generate a plurality of successively completed portions of the image of the sample over time; transmit a plurality of successive first images of the plurality of successively completed portions to the display visible to the user; receive a plurality of successive user inputs corresponding to a plurality of successive user-selected regions of interest from the plurality of successive first images; and transmit to the display a plurality of successive second images of the plurality of successive user-selected regions of interest. The plurality of successive first images may be transmitted over time, and the plurality of successive second images may be transmitted over time.

In some embodiments, the processor is configured with instructions to: update the completed portion of the image of the sample in response to image data from the imaging device so as to generate a plurality of successively completed portions of the image of the sample over time; transmit a plurality of successive low resolution images of the plurality of successively completed portions to the display visible to the user; receive a plurality of successive user inputs corresponding to a plurality of successive user-selected regions of interest from the plurality of successive low resolution images; and transmit to the display a plurality of successive high resolution images of the plurality of successive user-selected regions of interest. The plurality of successive low resolution images may be transmitted over time, and the plurality of successive high resolution images may be transmitted over time.

In some embodiments, the completed portion of the image of the sample is locally stored. The completed portion and the image device may be locally stored within a shared building.

In some embodiments, the second image corresponding to the completed portion of the image of the sample is transmitted to the display visible to the user over a network.

In some embodiments, the first image and the second image are transmitted over an internet to the display visible to the user.

In some embodiments, the first image and the second image comprise images from a microscope, and the server comprises a server housed in a building with the microscope and remote from the display visible to the user.

In some embodiments, the first image and the second image comprise images from a microscope, and the server comprises a server remote from the microscope and the display visible to the user. The first image and the second image may be transmitted over an internet to the display visible to the user.

In some embodiments, the server is configured to receive a third image and a fourth image adjacent the first image or the second image in response to the user input prior to receiving a second user input.

In some embodiments, the processor comprises instructions to send images of a plurality of regions which are adjacent to the first or second image automatically to the remote server or the user display and optionally to the remote server and the user display.

In another aspect, the present disclosure provides a user device comprising a display visible to a user and a processor coupled to the display. The processor comprises a storage medium configured with instructions to: display a first image stored in the storage medium to a display visible to a user, wherein the first image corresponds to a completed portion of an image of the sample; receive input corresponding to a user-selected region of interest in response to the first image; and display a second image corresponding to the completed portion of the image of the sample, wherein the second image comprises an image of the user-selected region of interest of the completed portion stored in the storage medium.

In some embodiments, the user-selected region of interest may correspond to a portion of the first image. The region of interest may comprise a region of the completed portion not fully shown in the first image.

In some embodiments, the first image comprises a low resolution image. The second image may comprise a resolution higher than that of the first image. For example, the resolution of the second image higher than that of the first image may be within a range from about 2 times to about 100 times the resolution of the first image.

In some embodiments, the input corresponding to a user-selected region of interest further comprises input corresponding to a user-selected zoom level, magnification, or resolution of the region of interest. The input may further comprise input corresponding to a user-selected color scheme, contrast, or brightness.

In some embodiments, the completed portion of the image of the sample corresponds to an entire pre-defined area of the sample.

In some embodiments, the first image and the second image are transferred to the display visible to the user via a network server. The network server does not have the completed image of the sample stored in its storage medium when the first image and the second image are transferred to the display.

In some embodiments, the completed image of the sample comprises an image of a part of the sample defined to be scanned with the instructions stored on the processor.

In some embodiments, the first image and the second image do not comprise an entire set of full resolution images of the completed portion.

In some embodiments, the instructions are configured to allow the user to access the image of the sample through a link which remains valid even when the image of the sample is transferred between the storage medium of the processor and a storage medium of the server. The instructions may be configured to allow the user to access the completed portion prior to completion of the image of the sample. The link may comprise an internet uniform resource locator (URL) or internet protocol (IP) address.

In some embodiments, the link provides the first image using a dedicated system resource and allows the user to select the region of interest in response to the first image, and the processor comprises instructions to transmit the second image without transferring all of the completed portion of the image of the sample. The user input may point to a location of the completed portion of the image of the sample, and the first image may comprise a thumbnail of the completed portion of the image of the sample.

In some embodiments, the processor is configured with instructions for local and remote users to provide annotations to the completed portion, and the processor is configured with instructions for the local and remote users to view the annotations to the completed portion of the image of the sample. The processor may be configured to allow the local and remote users to provide and view the annotations prior to completion of the image of the sample.

In some embodiments, the image of the sample comprises a high resolution image of the sample based on low resolution images captured using different illumination conditions.

In some embodiments, the processor is configured with instructions to receive input to suspend, abort, or alter construction of the image of the sample prior to completion.

In some embodiments, the second image is transmitted prior to completion of the construction of the image of the sample.

In some embodiments, the processor is configured with instructions to: receive a plurality of inputs corresponding to a plurality of user-selected regions of interest of the completed portion of the partially completed high resolution image of the sample and transmit a plurality of high resolution images of the plurality of user-selected regions of interest.

In some embodiments, the processor is configured with instructions to: display a plurality of successive low resolution images from a plurality of successively completed portions of the image of the sample; receive a plurality of successive user inputs corresponding to a plurality of successive user-selected regions of interest from the plurality of successive low resolution images; and receive and display a plurality of successive high resolution images of the plurality of successive user-selected regions of interest.

In some embodiments, the first image and the second image are transmitted over the internet to the display visible to the user.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
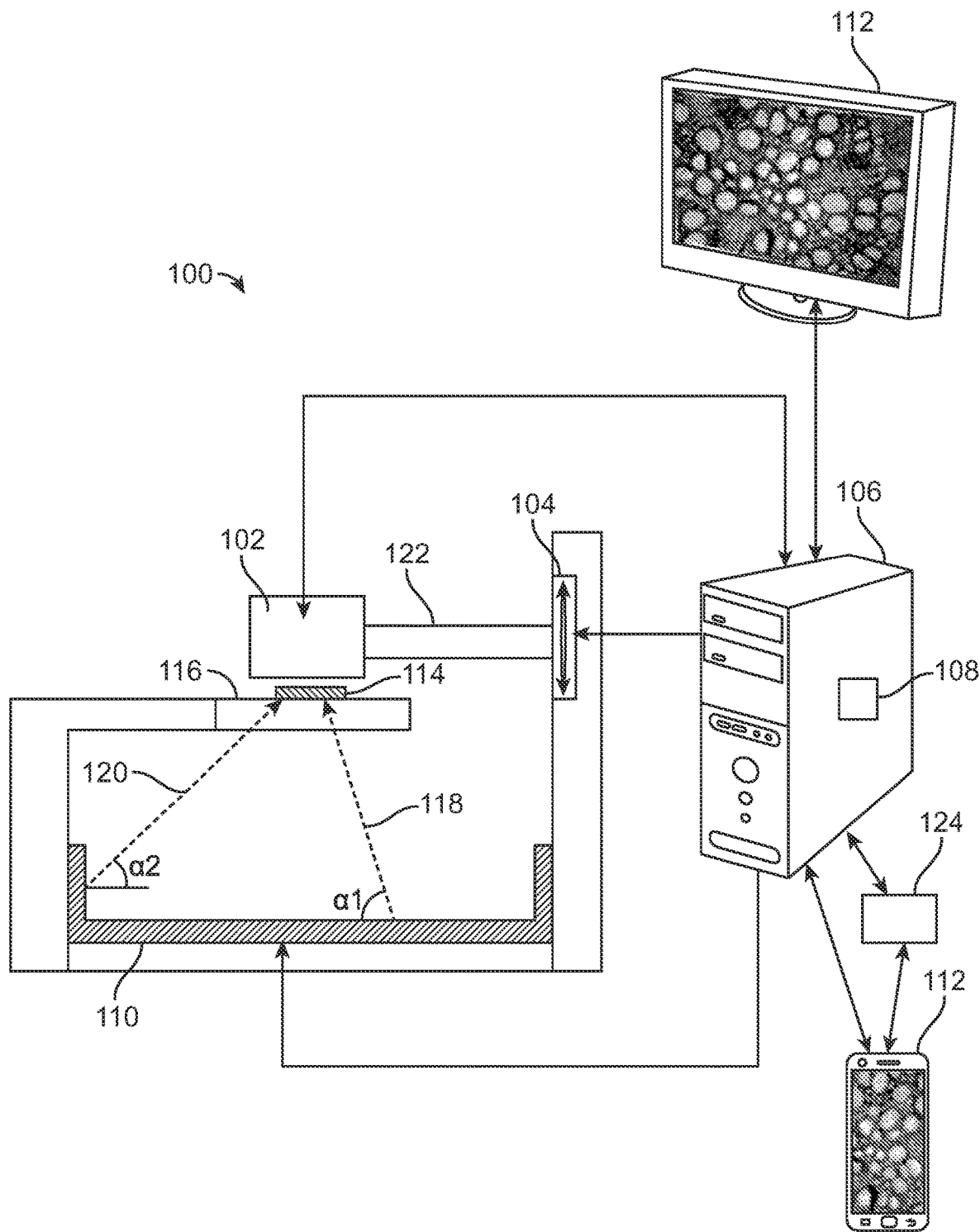
FIG. 1 is a diagrammatic representation of an exemplary microscope for processing images of a sample, in accordance with some embodiments.

A better understanding of the features and advantages of the present disclosure will be obtained by reference to the following detailed description that sets forth illustrative embodiments, in which the principles of embodiments of the present disclosure are utilized, and the accompanying drawings.

The embodiments disclosed herein can be combined in one or more of many ways to provide improved microscopes to provide images of a sample. One or more components of the embodiments disclosed herein can be combined with each other in many ways. In many embodiments, a microscope can be used to capture images of a sample, and the images of the sample can be transmitted to a server and made available to both users and non-users of the microscope to provide useful information related to attributes of the measured samples. The data transmitted to the server can be made available to users and non-users in many ways, for example via downloadable applications capable of connecting to the server or a web-based application or downloading information related to various images.

The embodiments disclosed herein are also capable of providing a database of attributes related to the image data of many samples and/or images of varying resolution of many samples or regions thereof. A mobile communication device can be configured for a user to input attributes of one or more measured samples in order to construct a database based on images of many samples.

As used herein like characters refer to like elements.

The term "sample," as used herein, generally refers to the subject matter to be imaged either together with or separate from any supporting structure present on which the subject matter to be imaged is placed (e.g., a slide). For example, the sample may include cells, tissue, plant material, materials surfaces, powders, fibers, microorganisms, etc. In some embodiments, the sample may be included on or in a supporting structure. For example, in some embodiments, the supporting structure may include a slide, such as a slide made from glass or other light transmissive material, or a glass plate or coverslip. Further, in some embodiments, the supporting structure including the sample and/or the sample itself may be located on a stage of the microscope. In other embodiments, the supporting structure including the sample may be secured to the microscope via an attaching member, a holding arm, a clamp, a clip, an adjustable frame, a locking mechanism, a spring or any combination thereof.

The term "microscope," as used herein, generally refers to any device or instrument for magnifying an object which is smaller than easily observable by the naked eye, i.e., creating an image of an object for a user where the image is larger than the object. One type of microscope may be an "optical microscope" that uses light in combination with an optical system for magnifying an object. An optical microscope may be a simple microscope having one or more magnifying lens. Another type of microscope may be a "computational microscope" that includes an image sensor and image-processing algorithms to enhance or magnify the object's size or other properties. The computational microscope may be a dedicated device or may be created by incorporating software and/or hardware into an existing optical microscope system to produce high-resolution digital images. In various embodiments, the microscope may use images of the sample captured under a plurality of illumination conditions. In one aspect of the disclosure, the microscope captures multiple images of the sample under different illumination conditions, aggregates image data from these images, and constructs a high-resolution image from the image data. This aspect of the disclosure is described in detail with reference to FIGS. 3-5. In one example, the microscope aggregates the image data in the Fourier plane and then uses inverse Fourier transform methods to construct the high-resolution image.

Overview of Microscope Assembly

FIG. 1 is a diagrammatic representation of a microscope 100 in accordance with some embodiments. As shown in FIG. 1, microscope 100 includes an image capture device, i.e., a detector 102, a focus actuator 104, a local computing device, i.e., processor 106 connected to memory 108, an illumination assembly 110, a user device 112, and a remote server 124. An example usage of microscope 100 may be capturing images of a sample 114, mounted on a stage 116, located within the field-of-view (FOV) of image capture device 102; processing the captured images; and presenting on user device 112 a magnified image of sample 114. User device 112 may be a remote computer system. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. Microscope 100 including processor 106 may be housed inside the same housing, inside connected housings, or inside housings located in proximity to one another to allow for intranet or direct connection.

Image capture device 102 may be used to capture images of sample 114. In this specification, the term "image capture device" includes a device that records the optical signals entering a lens as an image or a sequence of images, i.e. a detector. The optical signals may be in the near-infrared, infrared, visible, and/or ultraviolet spectrums. Examples of an image capture device include a CCD camera, a CMOS camera, a photo sensor array, a video camera, a mobile phone equipped with a camera, etc. Some embodiments may include only a single image capture device 102, while other embodiments may include two, three, or even four or more image capture devices 102. In some embodiments, image capture device 102 may be configured to capture images in a defined field-of-view (FOV). Also, when microscope 100 includes several image capture devices 102, image capture devices 102 may have overlap areas in their respective FOVs. Image capture device 102 may comprise one or more image sensors (not shown in FIG. 1) for capturing image data of sample 114. In other embodiments, image capture device 102 may be configured to capture images at an image resolution higher than 1 Megapixels, higher than 10 Megapixels, higher than 15 Megapixels, or higher than 20 Megapixels. The image resolution may also be within a range defined by any two of the preceding values. In some embodiments which incorporating line scanners, the pixel count of the sensor may be lower. In addition, image capture device 102 may also be configured to have a pixel size smaller than 5 micrometers, smaller than 3 micrometers, or smaller than 1.6 micrometers. The pixel size may also be within a range defined by any two of the preceding values.

In some embodiments, microscope 100 includes focus actuator 104. The term "focus actuator" refers to any device capable of converting input signals into physical motion for adjusting the relative distance between sample 114 and image capture device 102. Various focus actuators may be used, including, for example, linear motors, electrostrictive actuators, electrostatic motors, capacitive motors, voice coil actuators, magnetostrictive actuators, etc. In some embodiments, focus actuator 104 may include an analog position feedback sensor and/or a digital position feedback element. In some embodiments, focus actuator 104 is configured to receive instructions from processor 106 in order to make light beams converge to form a clear and sharply defined image of sample 114. In other embodiments, focus actuator 104 is configured to receive instructions from remote server 124. In the example illustrated in FIG. 1, focus actuator 104 may be configured to adjust the distance by moving image capture device 102. However, in other embodiments, focus actuator 104 may be configured to adjust the distance by moving stage 116, or by moving both image capture device 102 and stage 116.

Microscope 100 may include illumination assembly 110. The term "illumination assembly" refers to any device or system capable of projecting light to illuminate sample 114. Illumination assembly 110 may include any number of light sources, such as light emitting diodes (LEDs), lasers and lamps, configured to emit light. In one embodiment, illumination assembly 110 may include only a single light source, which is able to illuminate in one or more illumination conditions, such as through different light patterns, angles, etc. Alternatively, illumination assembly 110 may include two, four, five, sixteen, or even more than a hundred light sources organized in an array or a matrix. The number of light sources may also be within a range defined by any two of the preceding values. In some embodiments, illumination assembly 110 may use one or more light sources located at a surface parallel to the sample to illuminate sample 114. In other embodiments, illumination assembly 110 may use one or more light sources located at a straight or curved surface perpendicular or at an angle to sample 114.

In addition, illumination assembly 110 may be configured to illuminate sample 114 in a series of different illumination conditions. In one example, illumination assembly 110 may include a plurality of light sources arranged in different illumination angles, such as a two-dimensional arrangement of light sources. In this case, the different illumination conditions may include different illumination angles. For example, FIG. 1 depicts a beam 118 projected from a first illumination angle $\alpha_1$, and a beam 120 projected from a second illumination angle $\alpha_2$. In another example, illumination assembly 110 may include a plurality of light sources configured to emit light in different wavelengths. In this case, the different illumination conditions may include different wavelengths. In yet another example, illumination assembly 110 may be configured to use a number of light sources. In this case, the different illumination conditions may include different illumination patterns generated by one or more light sources. Accordingly and in accordance with some embodiments, the different illumination conditions may be selected from a group including: different illumination angles, different durations, different intensities, different positions, different illumination patterns, different wavelengths, or any combination thereof. In some embodiments, processor 106 receives a plurality of images associated with the sample and collected under different illumination conditions and initiates a computation process to generate a high resolution image of the region by combining image information selected from all or a portion of the plurality of images, as described in further detail in FIG. 5. In other embodiments, remote server 124 receives a plurality of images associated with the sample and initiates a computation process to construct a high resolution image of the region by combining image information selected from all or a portion of the plurality of images.

Microscope 100 may also include or be connected to stage 116. Stage 116 includes any rigid surface where sample 114 may be mounted for examination. Stage 116 may include a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may include a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the X-Y plane to enable imaging of multiple areas of the sample in, for example, a line-scanning pattern, a tile- or snake-scanning pattern, a non-successive scanning pattern (e.g., where some locations are not adjacent to a previous location), and a spiral-scanning pattern.

In accordance with some embodiments, microscope 100 may include, be connected with, or be in communication with (e.g., over a network or wirelessly, e.g., via Bluetooth or Wi-Fi) user device 112. The term "user device" refers to any device suitable for presenting a magnified image of sample 114 or any device suitable for receiving inputs from one or more users of microscope 100. FIG. 1 illustrates two examples of user device 112. The first example is a smartphone, computer, or a tablet wirelessly communicating with processor 106 over a Bluetooth, cellular connection or a Wi-Fi connection, directly or through remote server 124. The second example is a PC display physically connected to processor 106. In some embodiments, user device 112 may include user output devices, including, for example, a display, tactile device, speaker, etc. In other embodiments, user device 112 may include user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100.

User device 112 may be connected (physically, via a network, or wirelessly) with one or more processing devices, such as processor 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc. This aspect is described in more detail with reference to FIGS. 7-10. In accordance with some embodiments, microscope 100 may be in communication with (e.g. over a network or wirelessly, e.g. via Bluetooth) to remote server 124. This aspect is described in more detail with reference to FIGS. 7-10.

Figure 2A:
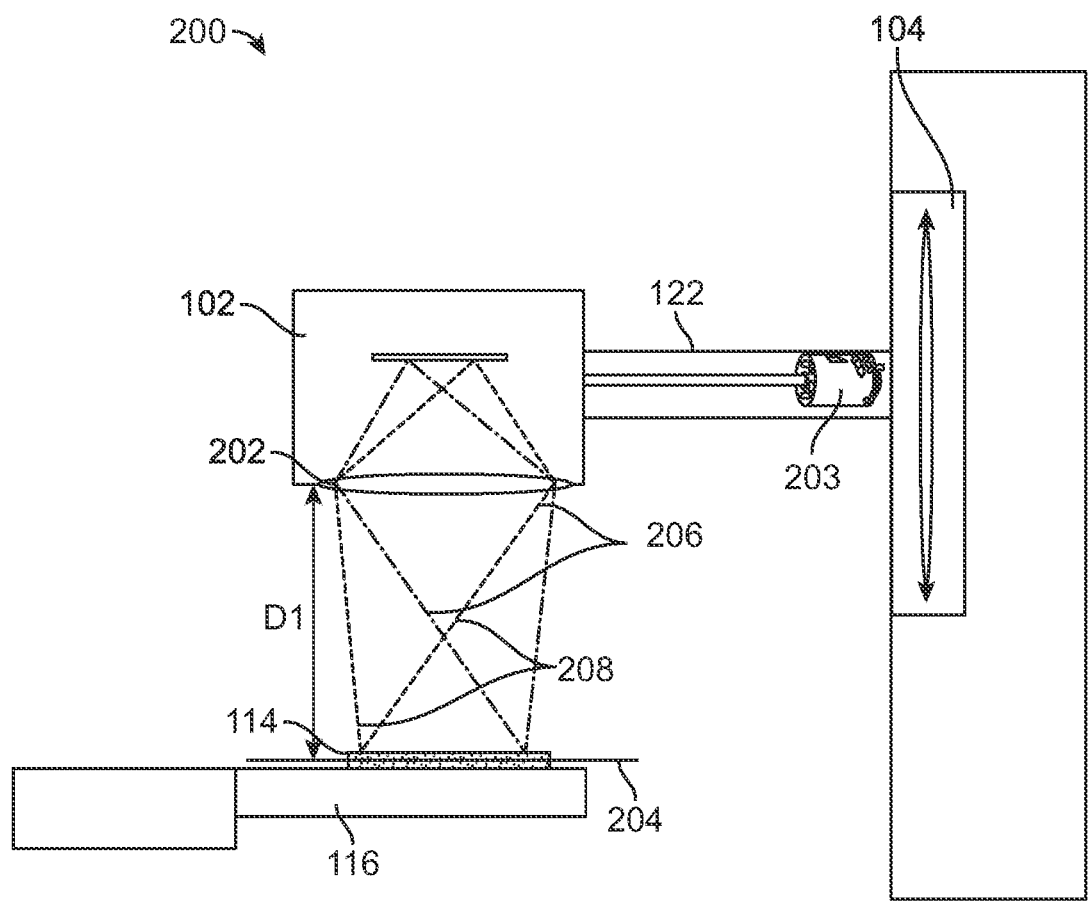
FIG. 2A is an exemplary partial side view of the microscope of FIG. 1, in accordance with some embodiments.
Figure 2B:
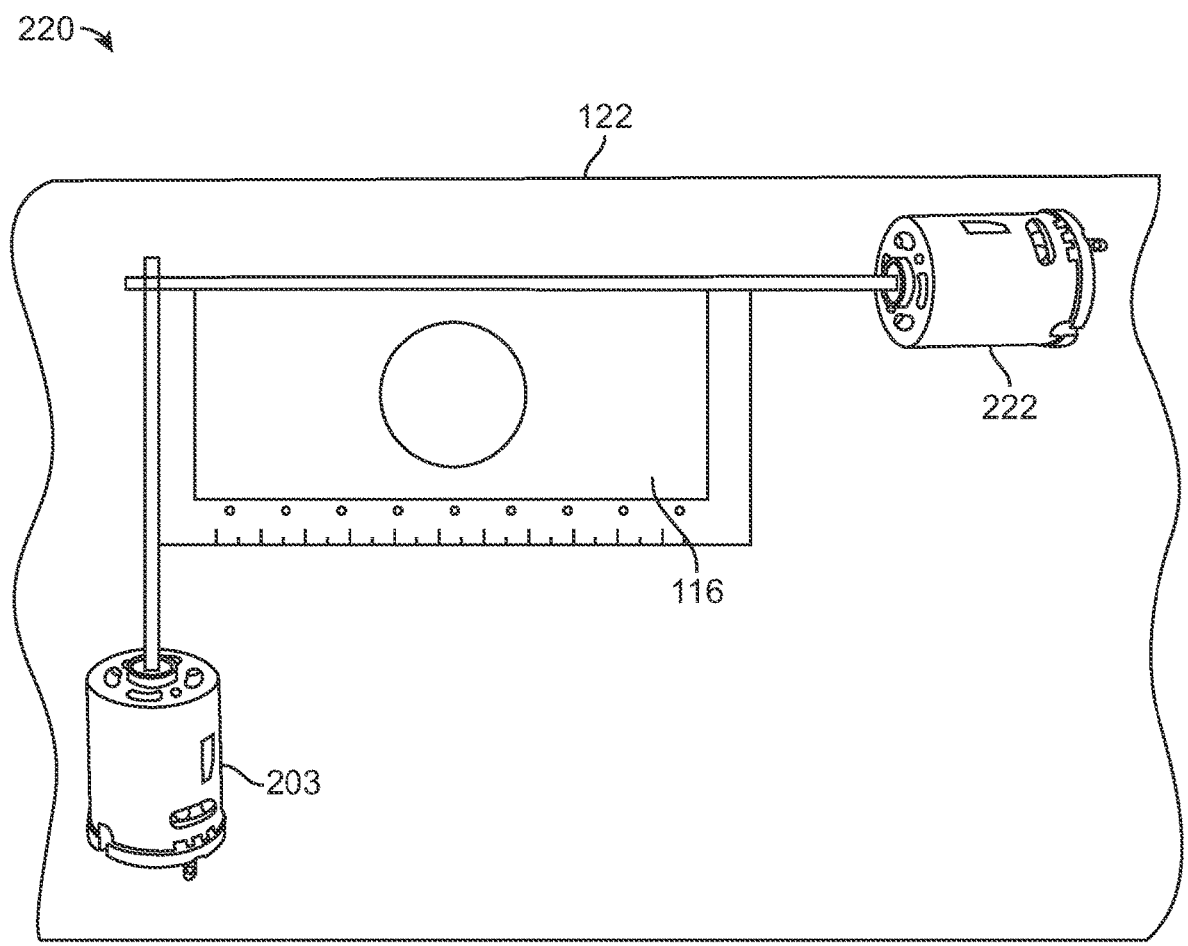
FIG. 2B is an exemplary transparent top view of the microscope arm 122 of FIG. 1 housing two scanning motors. While stage 116 is visible in this transparent view through arm 122, the image capture device 102 and hardware connecting the motors to the image capture device are not shown.

FIG. 2A is an exemplary side view 200 of the microscope of FIG. 1, in accordance with some embodiments. As shown in FIGS. 2A and 2B, image capture device 102 may include an image sensor and a lens 202. In microscopy, lens 202 may be referred to as an "objective lens" of microscope 100. Image capture device 102 may further include optical elements such as, but not limited to: lenses, a tube lens, a reduction lens, optical filters or apertures, active optical elements such as: spatial light modulators, LCD screens and others. In another embodiment, image capture device 102, may include an image sensor, without a lens. The term "image sensor" refers to a device capable of detecting and converting optical signals (e.g., light) into electrical signals. The electrical signals may be used to form an image or a video stream based on the detected signals.

Examples of image sensor may include semiconductor charge-coupled devices (CCD), active pixel sensors in complementary metal-oxide-semiconductor (CMOS), or N-type metal-oxide-semiconductor (NMOS, Live MOS). The term "lens" may refer to a ground or molded piece of glass, plastic, or other transparent material with opposite surfaces either or both of which are curved, by means of which light rays are refracted so that they converge or diverge to form an image. The term "lens" also refers to an element containing one or more lenses as defined above, such as in a microscope objective. The term "lens" may also refer to any optical element configured to transfer light in a specific way for the purpose of imaging. In some embodiments, such a lens may include a diffractive or scattering optical element. The lens is positioned at least generally transversely of the optical axis of image sensor. Lens 202 may be used for concentrating light beams from sample 114 and directing them towards image sensor. In some embodiments, image capture device 102 may include a fixed lens or a zoom lens.

Microscope 100 or microscope 200 may also include motors 203 and 222 located, for example, within microscope arm 122. Motors 203 and 222 include any machine or device capable of repositioning image capture device 102 of microscope 100 or 200. Motor 203 may include a step motor, voice coil motor, brushless motor, squiggle motor, piezo motor, or other motors, or a combination of any motor. Motors 203 and 222 may move image capture device 102 to various regions over sample 114 on stage 116. Motors 203 and 222 can work in conjunction with focus actuator 104. While FIGS. 2A and 2B show an arrangement in which motors 203 and 222 are used to move image capture device 102 (e.g., in an X-Y plane), a similar arrangement (not shown) may be used to move stage 116 and/or sample 114 relative to image capture device 102. For example, motors similar to motors 203/222 (or any other suitable actuator or positioning controlling device) may be employed to translate stage 116 and/or sample 114 at least in the plane perpendicular to the optical axis of image capture device 102. Such actuators may include, for example, linear motors, rotational motors, combinations of coarse and fine motors and others. In some embodiments, in order to provide relative motion between image capture device 102 and stage 116 and/or sample 114, a position of image capture device 102 may be controlled. In other embodiments, this relative motion may be achieved through control of a position of stage 116 and/or sample 114. And, in still other embodiments, this relative motion may be achieved through a combination of control of the positions of both image capture device 102 and the positions of stage 116 and/or sample 114.

When sample 114 is located at a focal-plane 204, the image projected from lens 202 is completely focused. The term "focal-plane" is used herein to describe a plane that is perpendicular to the optical axis of lens 202 and passes through the lens's focal point. The distance between focal plane 204 and the center of lens 202 is called the focal length and is represented by D1. In accordance with some embodiments, marginal rays 206 may correspond with beam 120 projected from beam illumination assembly 110 at illumination angle $\alpha_1$. In addition, marginal rays 208 may correspond with beam 118 projected from beam illumination assembly 110 at illumination angle $\alpha_2$.

FIG. 2B is an exemplary transparent top view of microscope arm 122. As shown, microscope arm 122 houses two scanning motors, motor 222 and motor 203, in accordance with some embodiments. Motor 203 may move image capture device 102 in the horizontal direction with respect to sample 114 on stage 116. Motor 222 may move image capture device 102 in the vertical direction with respect to sample 114 on stage 116. Memory 108 may store the position of image capture device 102. In some embodiments, processor 106 may be programmed to return image capture device 102 to a first region by way of motors 203 and 222. In other embodiments, remote server 124 may be programmed to return image capture device 102 to a first region by way of motors 203 and 222. Further, motors 203 and 222 may work in conjunction with focus actuator 104.

Figure 3:
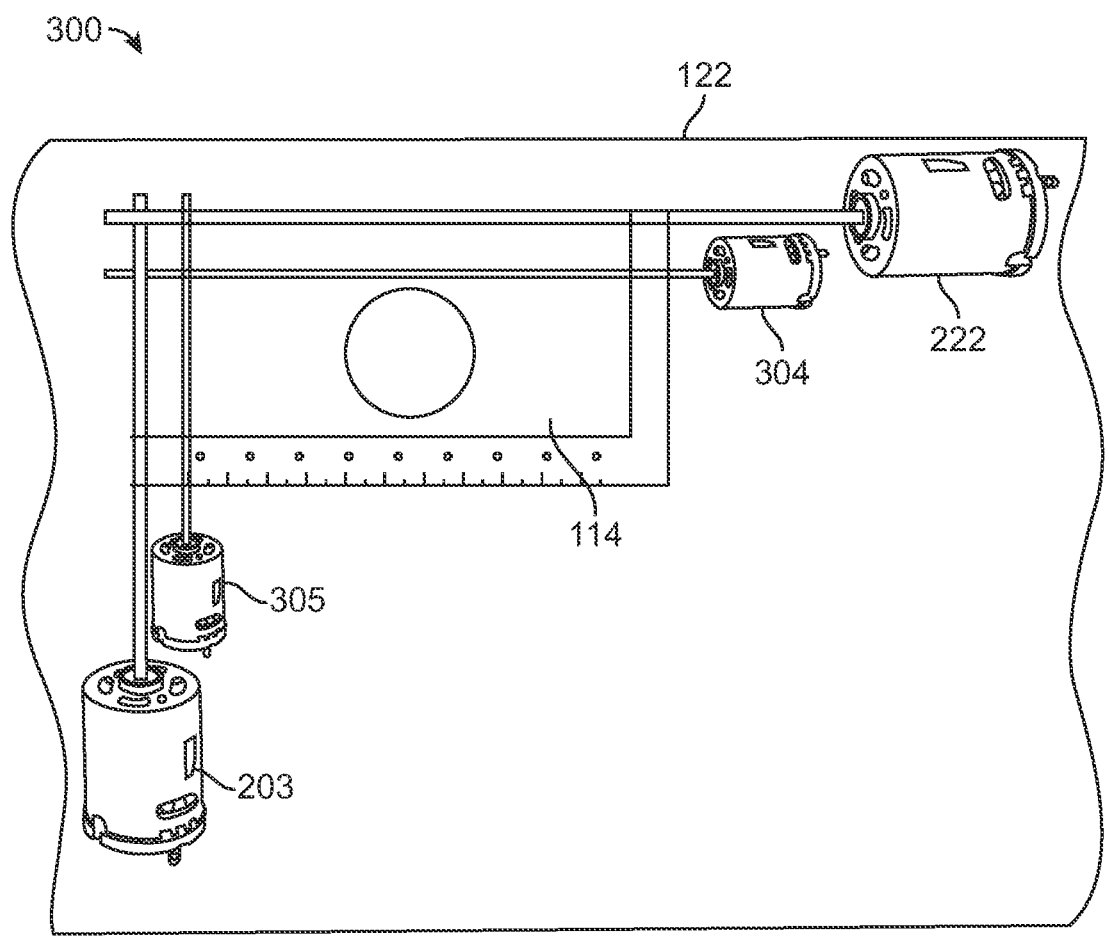
FIG. 3 is an exemplary transparent top view of the microscope arm of FIG. 1 housing four scanning motors, in accordance with some embodiments.

FIG. 3 is an exemplary transparent top view 300 of microscope arm 122 housing four scanning motors, consistent with the disclosed embodiments. Motors 203 and 305 can be used to achieve horizontal movement with respect to sample 114 on stage 116. Motors 222 and 304 can be used for vertical movement with respect to sample 114 on stage 116. Smaller motors 304 and 305 may be used for fine or slow movement of image capture device 102. Motors 222 and 203 may be used for coarse or fast movement of image capture device 102. In one embodiment, motors 222 and 203 may be used to move image capture device 102 from a first region towards a second region of sample 114 with large and fast movements. Once image capture device 102 is within close proximity to the second region, motors 304 and 305 are used for fine movement and place image capture device 102 in direct FOV of the second region. Memory 108 may store the position of the image capture device. Processor 106 may be programmed to return image capture device 102 to a first region by way of motors 203 and 222 initially, followed by motors 305 and 304. Motor 203, 222, 304 and 305 may work in conjunction with focus actuator 104.

Prioritization of Computation Processes

Figure 4A:
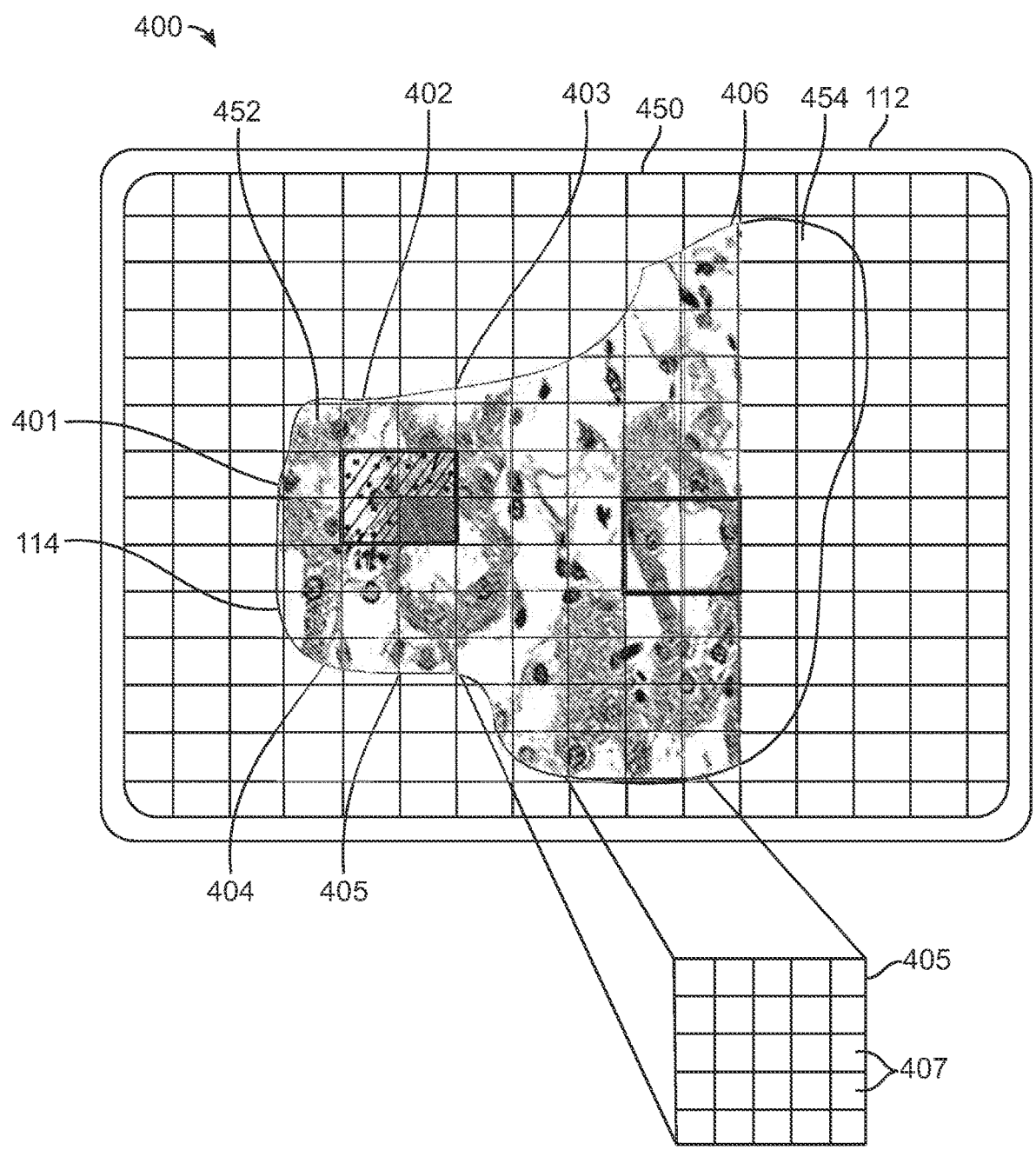
FIG. 4A is a schematic illustration of an exemplary sample shown on a display with a second region of a sample within a first region of a sample, in accordance with some embodiments.

FIG. 4A is a schematic illustration 400 of exemplary sample 114 shown on user device 112. In contrast with other microscopy systems (e.g., telemicroscopy) that may allow for sharing an image to a remote user, the disclosed systems may have the ability to: partition an image into portions or tiles to manage sharing a larger image, enable real time control of image collection and processing, and enable transfer to a local or remote server substantially in real time as an image is being captured or constructed or as additional images are being collected. Accordingly, the disclosed systems may permit partial or complete images to be shared without having to upload entire files and may provide images to remote users without requiring them to wait for an image to completely upload, which may take minutes and even hours for other microscope systems. Additionally, because the image may be available any time after a certain area is scanned, the disclosed systems may not require the sample to be in the device at the time of viewing. The disclosed systems may further have the ability to significantly expedite access to selected image information through prioritization of computation processes.

In one example of a prioritization process, described relative to FIG. 4A, a user or an automated system may identify a region of interest (ROI) of which or within which image information (for example, a high resolution image) is desired. In the case of an automated system, such a system may include, for example, a specifically programmed computer configured to analyze captured image information, identify potential areas of interest within the captured images (for example, an area in an image corresponding to a monolayer of cells or other microscopic elements), select a region of interest from among the identified areas, and initiate a process for constructing an image (for example, a high resolution image) of the selected areas of interest.

A user may view an image of sample 114 on a display of user device 112. The user may use an available interface tool (e.g., a pointing device, stylus, touch screen, cursor, etc.) to identify a region of interest 401 for which, e.g., a higher resolution image, a lower resolution image with a larger field of view, or an image having the same resolution as another image corresponding to another region of the sample is desired. After receiving corresponding instructions, microscope 100 may proceed to capture a plurality of images (for example, low resolution images captured under different illumination conditions or according to a predetermined pattern) to provide a basis for a computationally processed higher resolution image of region of interest 401, or to send existing images (e.g., low resolution images) having a desired resolution and corresponding to a desired region of interest as per the demand of the user.

For example, to capture images from which the higher resolution image may be constructed, microscope 100 may position image capture device 102 and/or stage 116 or sample 114 such that a field of view (FOV) of image capture device 102 overlaps with region of interest 401. In some cases, the FOV of image capture device 102 may fully encompass region of interest 401. In those cases, microscope 100 may proceed by capturing multiple images, each being associated with a different illumination condition, of region of interest 401 falling within the FOV of image capture device 102. It is from these captured images that the processor may construct an image having a resolution higher than any of the captured images.

In some cases, the FOV of image capture device 102 may not fully overlap with region of interest 401. In those cases, processor 106 may cause image capture device 102 to move relative to stage 116 and/or sample 114 in order to capture images of the sample over the entire region of interest 401. For example, in some embodiments, processor 106 may partition the region of interest 401 into image capture regions, such as regions 402, 403, 404, or 405. In order to capture images needed to construct a high resolution image of region of interest 401, processor 106 may position image capture device 102 relative to sample 114 such that each image capture region falls within the FOV of image capture device 102. Then, for each image capture region, one or more images may be captured, and processor 106 (or another computational device) may construct the overall high resolution image of region of interest 401 based on the multiple images obtained for each of the image capture regions 402, 403, 404, and 405. The regions may partially overlap or have no overlap, and this may apply to any region in the examples described herein.

In some embodiments, computation of the high resolution image may proceed in a single process for an entire region of interest. That is, processor 106 may be capable of computationally assembling a high resolution image by processing the full areas of images captured for the region of interest (where the FOV fully overlaps the region of interest) or by processing the full areas of images captured for each image capture region.

In some cases, a remote user may provide instructions receivable by a processor 106 coupled to a microscope 100 to construct an image from a plurality of other images. In other words, the user may request that a plurality of images corresponding to smaller regions of a sample are combined or "stitched" together to form a larger image corresponding to a larger region of the sample. In some instances, all of the images necessary for construction of the image may have already been captured. For example, a user may request an image corresponding to region of interest 401, and the processor 106 may use previously collected images corresponding to image capture regions 402, 403, 404, and 405 to construct an image corresponding to region of interest 401. In other instances, one or more images are collected upon receipt of the user request in order to provide a basis for the constructed image. For example, a user may request an image corresponding to region of interest 401, and the processor 106 may cause image capture device 102 to collect an image corresponding to image capture region 405 for use in construction of an image corresponding to region of interest 401 along with previously collected images corresponding to image capture regions 402, 403, and 404. In some cases, processor 106 may cause image capture device 102 to move relative to stage 116 and/or sample 114 in order to capture images of the sample such as, in the previous example, an image corresponding to image capture region 405.

In other embodiments, however, construction of an image such as a high resolution image may proceed on a more granular level. For example, the plurality of images associated with each unique position of the image capture device 102 relative to sample 114 may be collected or processed by segmenting the image areas into computational blocks. Thus, for the examples described above, in the instance where the FOV of image capture device 102 fully overlaps region of interest 401, the images captured of region of interest 401 may be divided into blocks for processing. In order to construct an image of region of interest 401, such as a high resolution image, processor 106 would serially (according to a predetermined order, or the order of acquisition or an algorithm to determine the order) process the image data from corresponding blocks of the plurality of images and construct an image portion for each block (e.g., a high resolution portion for each block). In other words, processor 106 may collect all of the image data from the plurality of captured images falling within a first block and construct a portion of a desired image (e.g., a high resolution image corresponding to the region of interest to a remote user) corresponding to a region of sample 114 falling within the first block. The processor 106 may repeat this process for the second block, third block, up to N-blocks until all of the computational blocks have been processed, and a complete image (e.g., a high resolution image) of region of interest 401 can be assembled.

In other cases, as noted above, the FOV of image capture device 102 may not overlap with an entire region of interest 401. In such cases, as described, region of interest 401 may be subdivided into image capture regions 402, 403, 404, and 405, for example. And, in order to construct an image of region of interest 401 (e.g., a high resolution image), a plurality of images captured for each image capture region may be processed or combined (e.g., "stitched") together to construct a portion of the image (e.g., a high resolution image) corresponding to each image capture region. The complete image (e.g., a complete high resolution image) of region of interest 401 may be constructed by combining the portions of the image corresponding to each image capture area. In many embodiments, the system may construct a "pyramid" of files corresponding to an image capture area or a portion thereof which hold the data at different resolutions, to allow for images to be retrieved and accessed efficiently.

The plurality of images associated with each image capture region (for example, each being associated with a different illumination condition) may be processed by analyzing and comparing the full areas of the capture images to one another. Alternatively, and similar to the process described above, the processing of the captured images may proceed in a stepwise fashion by processing portions of the captured images associated with respective computational blocks. With reference to FIG. 4A, for example, processing of an image capture region 405 (which may correspond to a FOV of image capture device 102 and a portion of region of interest 401) may proceed by processing the captured plurality of images associated with region 405 according to computational blocks 407. Each computational block 407 may be associated with a portion of the plurality of images in region 405 and, therefore, may be associated with a region of sample 114. Processor 106 may operate on a first computational block (for example, the block in the upper left corner of region 405) and construct an image segment (e.g., a high resolution image segment) associated with the first block based on the plurality of images captured at region 405. The image of region of interest 401 may be obtained by processing each subsequent block 407 within region 405 (e.g., according to a predetermined pattern or sequence or algorithm for choosing the order), constructing an image segment (e.g., a high resolution image segment) for each block, combining the image segments to obtain an image (e.g., a high resolution image) of region 405, and following similar processes for each of the other image capture regions (e.g., regions 402, 403, and 404) within region of interest 401. The image portions (e.g., high resolution image portions) associated with each image capture region may be assembled together to provide the image (e.g., a high resolution image) of region of interest 401.

Generation of an image (e.g., a high resolution image) of region of interest 401 may require significant periods of time. For example, a certain amount of time may be associated with capturing the plurality of images associated with region of interest 401 or image capture regions 402, etc. And, while computational speed of presently available controllers is significantly higher than those available even a few years ago, and the speed of controllers continues to improve, the computations associated with the construction of images such as high resolution images of a region of interest may take considerable time in addition to the time required for mechanical motion and other aspects in the system. This image capture time and computational time can be slow and, therefore, hinder analysis of a sample by a user or automated system. For example, in other systems, if while a particular region of interest 401 is being imaged and processed, another region of interest 406 is identified, the user or system may have to wait until all image capture and processing relative to area 401 is complete before the system moves to area 406 for imaging and processing. The same may be true even within a particular region of interest. For example, if during imaging and/or processing of capture region 402 the user or system determines that the portion of sample falling within image capture region 405 is of more interest, the user of another system may have to wait until all of the images of capture regions 402, 403, 404, and 405 have been captured, and all processing of images in regions 402, 403, and 404 is complete before the system will process the images in region 405. On an even more granular level, during processing of computational blocks within a particular image capture region 405, a user of another system may determine that one or more other computational blocks within the same image capture region or even a different image capture region corresponds to a higher priority region of interest on sample 114. But before the image segment (e.g., a high resolution image segment) of the higher priority region of interest of sample 114 is available, this user must wait until processor 106 completes processing of all computational blocks of region 405 occurring in the computation sequence prior to the block of higher interest.

The presently disclosed embodiments aim to add flexibility in microscope 100 to an analysis tool and shorten analysis time by enabling prioritization of image capture and computational processing as well as access to image files and information of interest to a user without requiring that the image files be uploaded to a remote storage or directly sent, but rather provided "on demand". For example, a user of the systems disclosed herein may become interested in a particular second region of a sample (e.g., a region containing a blood cell) after viewing an initial low quality image, while the system is generating an image (e.g., a high resolution image) of a first region of interest, and before this computation process is complete. Instead of waiting for the entire computation process associated with generating an image (e.g., a high resolution image) of the first region to complete, the user may request to prioritize image collection in the second region of interest or a second image construction process associated with the second region of interest. In some instances, the first region may correspond to region of interest 401 and the second region may correspond to a different region of interest 406. Alternatively, the first region may correspond to region of interest 401, and the second region may correspond to a particular image capture region within region of interest 401 (e.g., region 405 or any portion of region 405). Still further, first region may correspond to region of interest 401, and the second region may correspond to a region of the sample overlapped by one or more computational blocks 407 within capture region 405, for example. The system may be configured to respond to a request from a user by, for example, suspending or aborting image capture and/or processing associated with the first region of interest in favor of image capture and/or processing associated with the second region of interest. In this way, image information of higher interest areas of a sample becomes available in the order that the higher interest areas are identified and without having to wait until an initiated process (e.g., image collection or image construction) has completed. Further, in some embodiments a user may be able to view all or a portion of an image of the first region, such as a stitched-together or high resolution image, on a user display coupled to a processor or microscope system. For the purposes of illustration, the exemplary image of FIG. 4A includes a partially completed image 450. The partially completed image 450 may comprise a completed portion 452 and an incomplete portion 454. The portions 452 and 454 are described in further detail in FIGS. 7-9. In some embodiments, these portions comprise high resolution images.

While the examples above are described with respect to the first region of sample 114 corresponding to region of interest 401, the first region of sample 114 may correspond to any other image area including image capture regions within or overlapping with region of interest 401. For example, the first region of sample 114 may correspond to image capture region 402, image capture region 403, image capture region 404, image capture region 405, or any other image capture region. Similarly, the first region of interest of sample 114 may correspond to any computational block in any region of interest, including any image capture region. The same may be equally true of the second region of interest of sample 114.

In one example, as each computational block may be associated with multiple images to be processed in order to construct an output image (e.g., a high resolution image constructed from lower resolution images or parts of images associated with each block), processor 106 may plan to begin processing images associated with region of interest 401 in a specific sequence. For instance, processor 106 may plan to process images associated with image capture region 402, followed by images associated with image capture region 403, followed by images associated with image capture region 404, followed by images associated with image capture region 405, in accordance with the order in which the images were captured. However, processor 106 may receive a request (e.g., from a remote user or automated system) to prioritize processing of images associated with image capture region 405, which is the last region in the queue for processing. A request can be initiated by a person, or received by a program over a network or through user device 112. After receiving the request, processor 106 may suspend or abort its planned computation process and reorder the queue to prioritize processing of region 405, instead of following the original sequence: 402, 403, 404, and 405. After the prioritized region is processed, the queue may continue with the original order for processing. The new order can be, for example, 405, 402, 403, and 404. Any of the completed or partially processed images described in these examples may be locally stored, uploaded to a remote server, and/or provided (e.g., transmitted) to a display available to a user.

In another embodiment, processor 106 may complete a computation process (for example, constructing a high resolution image from many low resolution images) for the image capture region (e.g., image capture region 402) that it was working on when it received the new priority request. In such an embodiment, the new order of processing can be, for example, 402, 405, 403, and 404. In yet another embodiment, processor 106 may suspend processing of an image capture region (e.g., 402) before its completion. In such an embodiment, processor 106 may resume at the unfinished portion after completing its processing of the prioritized region (e.g., 405). For example, processor 106 may receive instructions to prioritize image capture region 405 when it has completed one-fifth (or another portion) of a computation processing image capture region 402. Processor 106 may then suspend processing image capture region 402 and begin processing image capture region 405. Once the prioritized image capture region 405 has been processed (which may result in, for example, a high resolution image associated with the prioritized image capture region 405), the system will return to the partially processed image capture region 402 to complete the remaining four-fifths of the processing. In such an embodiment, the new processing order can be, for example, 402 (partial), 405, 402 (remainder), 403, 404. In yet another embodiment, the prioritized image capture region 405 can be processed simultaneously with the image capture region 402 that was being processed before the prioritization request, e.g., through parallel-processing. In such an embodiment, the new processing order can be, for example, 402 and 405 (in parallel), 403, 404. Any of the completed or partially processed images described in these examples may be locally stored, uploaded to a remote server, and/or provided (e.g., transmitted) to a display available to a user.

As another example, region of interest 401 may correspond to a single FOV of image capture device 102. Region of interest 401 may be divided into computational blocks for computation (similar to image capture region 405 as shown in FIG. 4A). The predetermined sequence for processing computational blocks of region of interest 401 may be 1, 2, 3, 4, where each number designates a computational block from among N computational blocks associated with region of interest 401. After completing the processing of block 1 and during processing block 2, a request may arrive to prioritize a second image capture region within region of interest 401 corresponding to one or more other blocks (e.g., block 4). The processor may be programmed or instructed to act in several ways, and examples of such responses may include the following: (i) The processor may respond by finishing computing block 2 before moving on to block 4, in which case the order will be 1, 2, 4, 3, etc. (ii) The processor may respond by suspending computation on block 2 and completing it after computing block 4, in which case the order will be 1, 2, 4, 2, 3, etc. (iii) The processor may respond by suspending computation on block 2, computing the prioritized blocks 4 and 3, and finally completing block 2, in which case the order will be 1, 2, 4, 3, 2, etc. (iv) The processor may respond by suspending computation on block 2, computing block 4, and stopping computations until further instructions, in which case the order will be 1, 2, 4. Any of the completed or partially processed images described in these examples may be locally stored, uploaded to a remote server, and/or provided (e.g., transmitted) to a display available to a user.

Another example of an instance where computation may need to be prioritized may include the situation in which the region of interest that was captured contains several FOVs of image capture device 102. Inside the region of interest are a first region 404 and a second region 405. In one example, first region 404 is being processed, and the system is instructed not to include second region 405 in the queue (such a case can happen for example in analysis of a blood sample, where the system might detect a monolayer area and ignore areas on the "feathered edge" or bulk'). In this case, a user might request that second region 405 be prioritized, and it will be added to the queue before, after, or in parallel to first region 404. In another example, second region 405 may be later in the queue than first region 404, and the system may prioritize it in a manner similar to those described above.

Several examples for prioritization have been described above. It should be noted that the described prioritization processes may be performed relative to any two or more regions associated with sample 114. Those regions of sample 114 may include computational blocks, image capture regions, areas of interest, fields-of-view associated with image capture device 102 or combinations thereof. Further, it is noted that image collection in a particular region of interest may be prioritized over image collection in another region of interest, that image collection in a particular region of interest may be prioritized over image processing in another region of interest, or that image processing in a particular region of interest may be prioritized over image collection in another region of interest, whether the regions of interest are non-overlapping, overlapping, or contained within one another. Any completed or partially processed images collected or processed by a microscope system may be locally stored, uploaded to a remote server, and/or provided (e.g., transmitted) to a display available to a user.

Figure 4B:
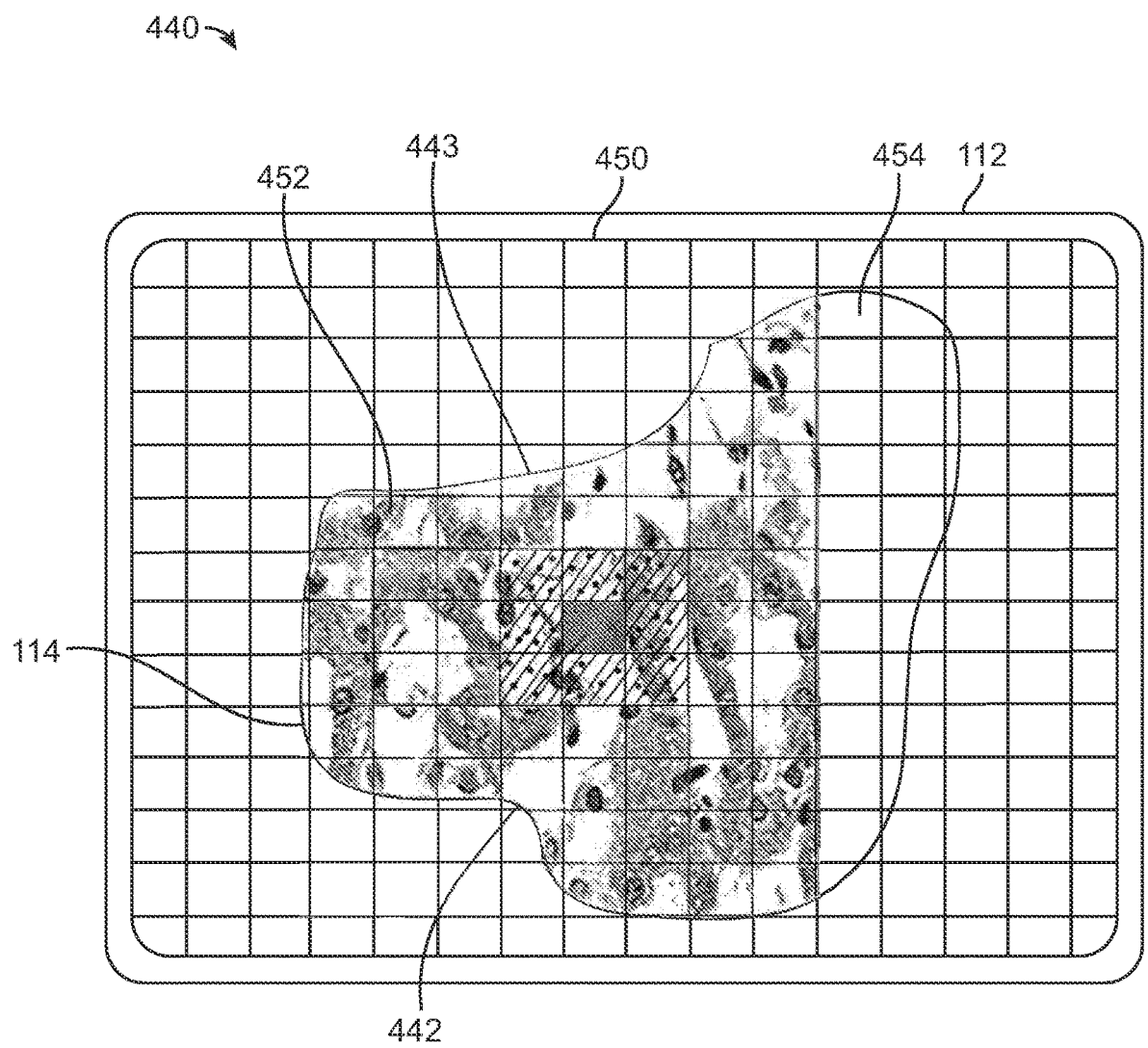
FIG. 4B is a schematic illustration of an exemplary image shown on a display with a first region surrounding a second region of a sample, in accordance with some embodiments.
Figure 6:
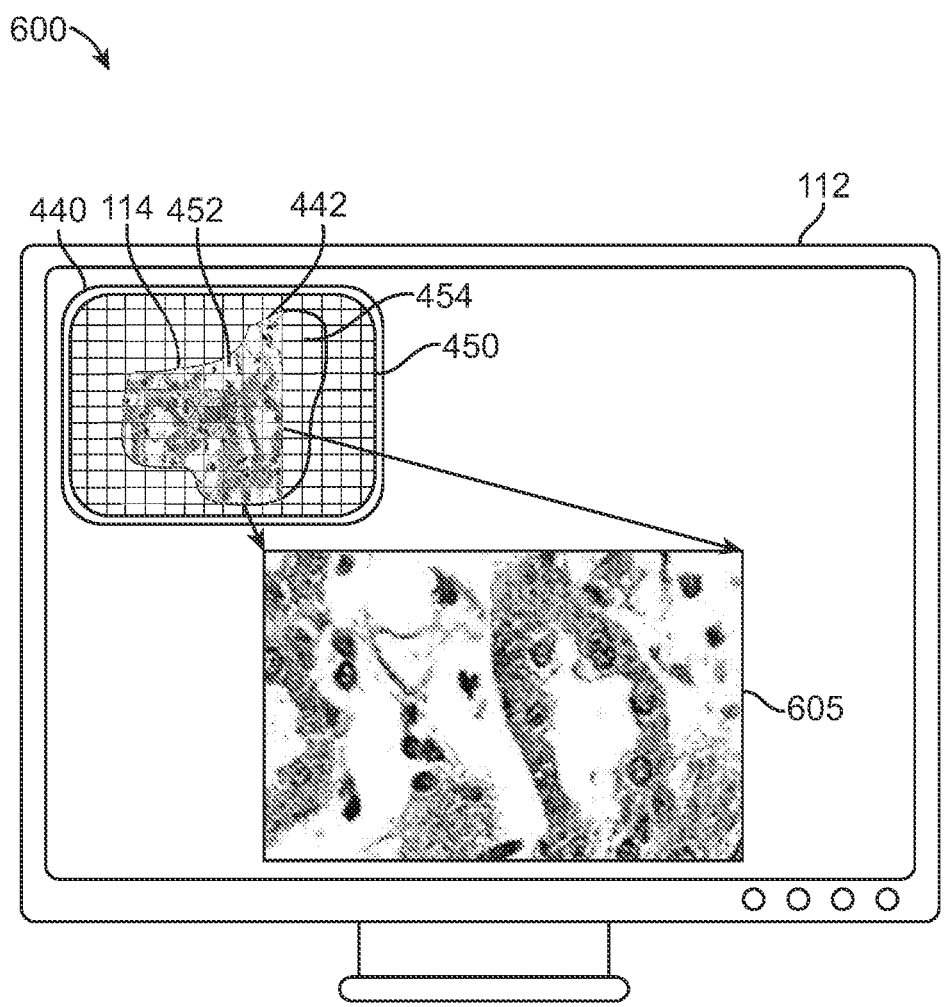
FIG. 6 is a schematic illustration of an exemplary display showing a high resolution image of a region of a sample, in accordance with some embodiments.

FIG. 4B is a schematic illustration 440 of an exemplary image shown on a user device 112 with a region of interest 443 surrounding a region of interest 442, consistent with the disclosed embodiments and as described in further detail in FIG. 6. The image may include a partially completed image 450 that may be a partially completed high resolution image. The partially completed image 450 may comprise a complete portion of the partially completed high resolution image 452 and an incomplete portion of the partially completed high resolution image 454, as described in further detail with regard to FIGS. 7-9.

Overview of Image Processing

There are several potential methods in the field of computational imaging processing for producing a high-resolution image of a sample from a set of low-resolution images. One of these methods is, for example, ptychography. In accordance with some embodiments, processor 106 may receive images at a first (e.g., low) image resolution and construct an image of sample 114 having a second (e.g., enhanced or high) image resolution. In other embodiments, remote server 124 may receive images at a first image resolution and construct a higher resolution image of a sample. The term "image resolution" is a measure of the degree to which the image represents the fine details of sample 114. The quality of a digital image may also be related to the number of pixels and the range of brightness values available for each pixel. In some embodiments, constructing an enhanced (e.g. high) resolution image of sample 114 is based on images having an image resolution lower than the enhanced image resolution. The enhanced image resolution may have at least 1.5 times, 2 times, 5 times, 10 times, 100 times, or more times as many pixels as the lower image resolution images. The enhanced (e.g., high) resolution may also be within a range defined by any two of the preceding values. For example, the first image resolution of the captured images (the "low resolution image") may have a value between, for example, 1 megapixel and 25 megapixels, between 10 megapixels and 20 megapixels, or about 15 megapixels. The second image resolution of the constructed image (the "high resolution image") may have a value higher than 10 megapixels, higher than 100 megapixels, higher than 500 megapixels, or higher than 1000 megapixels.

Figure 5:
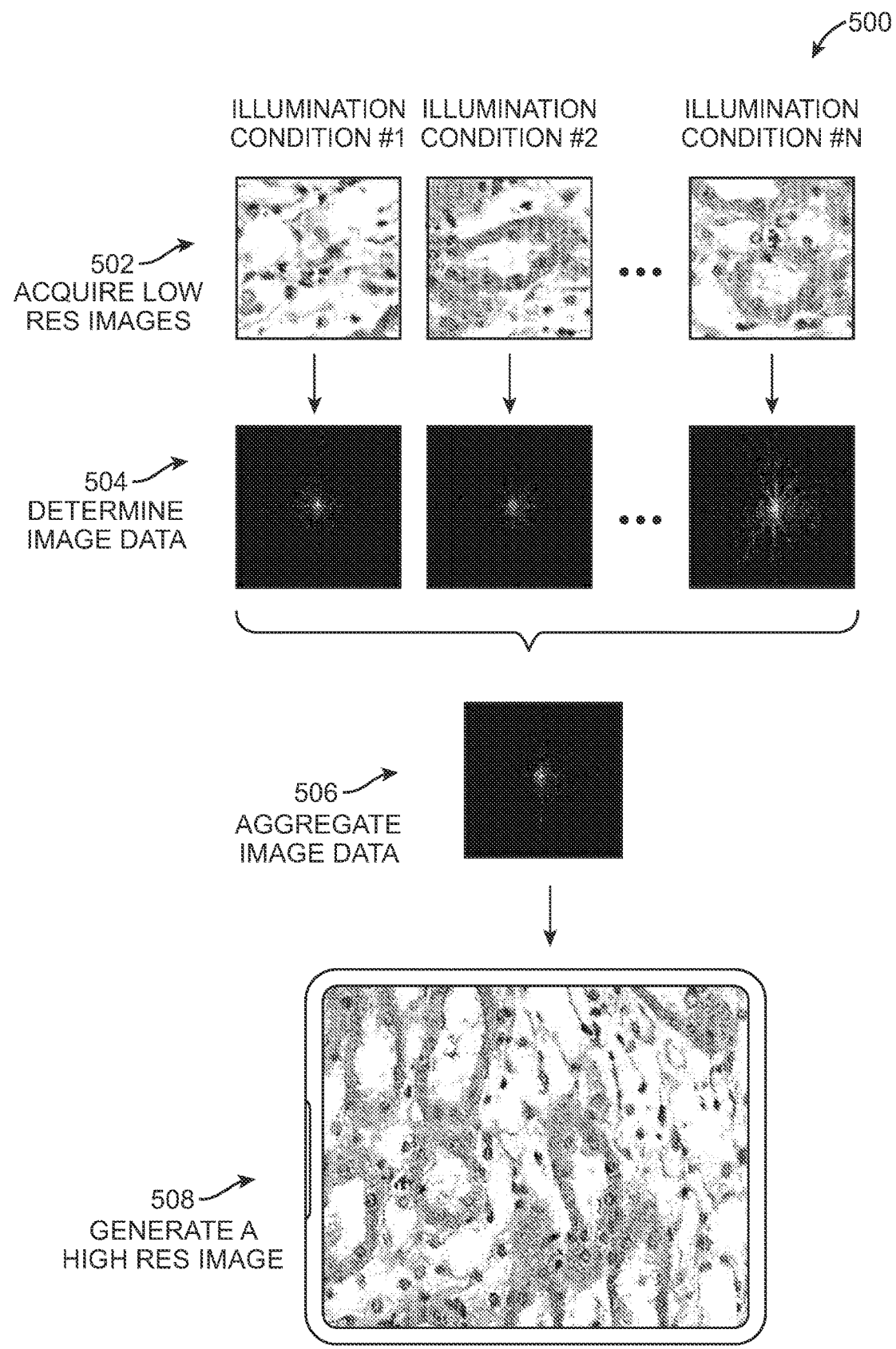
FIG. 5 is an illustration of an exemplary process for constructing an image of a sample using a set of low resolution images acquired under a plurality of illumination conditions, in accordance with some embodiments.

FIG. 5 is an illustration of an exemplary process 500 for constructing an image of sample 114, in accordance with some embodiments. At step 502, processor 106 may acquire from image capture device 102 a plurality of low resolution images of sample 114. The plurality of images may include at least one image for each of a set of different illumination conditions. As described herein, the different illumination conditions may include at least one of: different illumination angles, different illumination patterns, different illumination durations, different illumination intensities, different wavelengths, zoom levels, magnifications, resolutions, or a combination thereof. In some embodiments, the total number (N) of the plurality of different illumination conditions is between 2 to 10, between 5 to 50, between 10 to 100, between 50 to 1000, or more than 1000.

At step 504, processor 106 may determine image data of sample 114 associated with each illumination condition. For example, processor 106 may apply a Fourier transform on images acquired from image capture device 102 to obtain Fourier transformed images. The Fourier transform is an image processing tool which is used to decompose an image into its sine and cosine components. The input of the transformation may be an image in the normal image space (also known as real-space), while the output of the transformation may be a representation of the image in the frequency domain (also known as a Fourier-space). The output of a transformation, such as the Fourier transform, may be referred to as image data. Alternatively, processor 106 may use other transformations, such as a Laplace transform, a Z transform, a Gelfand transform, or a Wavelet transform. In order to rapidly and efficiently convert the captured images into images in the Fourier-space, processor 106 may use a Fast Fourier Transform (FFT) algorithm to compute the Discrete Fourier Transform (DFT) by factorizing the DFT matrix into a product of sparse (mostly zero) factors.

At step 506, processor 106 may aggregate the image data determined from images captured under a plurality of illumination conditions to form a combined complex image. One way for processor 106 to aggregate the image data is by locating in the Fourier-space overlapping regions in the image data. Another way for processor 106 to aggregate the image data is by determining the intensity and phase for the acquired low-resolution images per illumination condition. In this way, the image data, corresponding to the different illumination conditions, does not necessarily include overlapping regions.

At step 508, processor 106 may construct a high-resolution image of sample 114. For example, processor 106 may apply the inverse Fourier transform to obtain the constructed image. In one embodiment, depicted in FIG. 5, the constructed high-resolution image of sample 114 may be shown on a display (e.g., user device 112). In another embodiment, the constructed high-resolution image of sample 114 may be used to identify at least one element of sample 114. The at least one element of sample 114 may include any organic or nonorganic material identifiable using a microscope. Examples of the at least one element include, but are not limited to, biomolecules, whole cells, portions of cells such as various cell components (e.g., cytoplasm, mitochondria, nucleus, chromosomes, nucleoli, nuclear membrane, cell membrane, Golgi apparatus, lysosomes), cell-secreted components (e.g., proteins secreted to intercellular space, proteins secreted to body fluids, such as serum, cerebrospinal fluid, urine), microorganisms, and more. In some embodiments, the constructed image may be used in the following procedures: blood cell recognition, identification of chromosomes and karyotypes, detection of parasitic infections, and more.

Microscope which Acts as a Server

Images from large samples can create very large image files, particularly when these images comprise image data from a plurality of other images and/or are high resolution images. These images may take a long time to share even with network connections. Therefore, it is advantageous make the images to be shared as small as possible or, alternatively, to share only the portions of the images that are relevant to a user. It is also advantageous to construct images (e.g., high resolution images) corresponding only to those portions of the sample which are of interest to a user. To accomplish this, portions (e.g., completed portions) of a completed or partially completed microscope image may be shared with (e.g., transmitted to) a remote server or a display viewable to a user substantially in real time, such that a remote user may select for viewing another image or set of images corresponding to microscope image (e.g., an image in a different region of the sample [such as a non-overlapping, overlapping, or contained region of the sample], an image captured using a different illumination condition, or an image captured or viewed at a different zoom level, magnification, or resolution); to suspend, abort, or alter the completion of the construction of the microscope image (e.g., a high resolution microscope image); to make changes to the illumination conditions or region of interest before unnecessary images are created; or to collect images in the same or a different region of the sample [such as a non-overlapping, overlapping, or contained region of the sample].

FIG. 6 is a schematic illustration 600 of an exemplary display showing an image constructed from a region of interest, in accordance with some embodiments. The image may be a high resolution image constructed from the method of FIG. 5 or by another method. Alternatively, the image may be an image other than a high resolution image, such as an image stitched together from other collected images or images having partial resolution of the full resolution one (e.g., from a pyramid of images). User device 112 shows a view of a display 440. User device 112 also shows a magnified view of an image 605 of region of interest 442 of sample 114. Image 605 may be a high resolution image. The exemplary display includes a partially completed microscope image 450 that may be a high resolution image. The partially completed microscope image may be constructed, for example, from many low resolution images corresponding to different illumination conditions or from images corresponding to different areas of sample 114. The partially completed microscope image 450 may comprise a complete portion of the partially completed microscope image 452 as well as an incomplete portion of the partially completed microscope image 454. The incomplete portion of the microscope image may comprise a single low resolution image or few low resolution images (e.g., corresponding to different computational blocks or illumination conditions), images corresponding to different regions of sample 114, or no image at all. The complete portion of the partially completed microscope image may comprise a sufficient number of low resolution images to construct a high resolution image by a method such as in FIG. 5, or a sufficient number of images to construct an image by, for example, combining multiple images (e.g., "stitching together" images). The portions 452 and 454 are described in further detail with regard to FIGS. 7-9.

Figure 7:
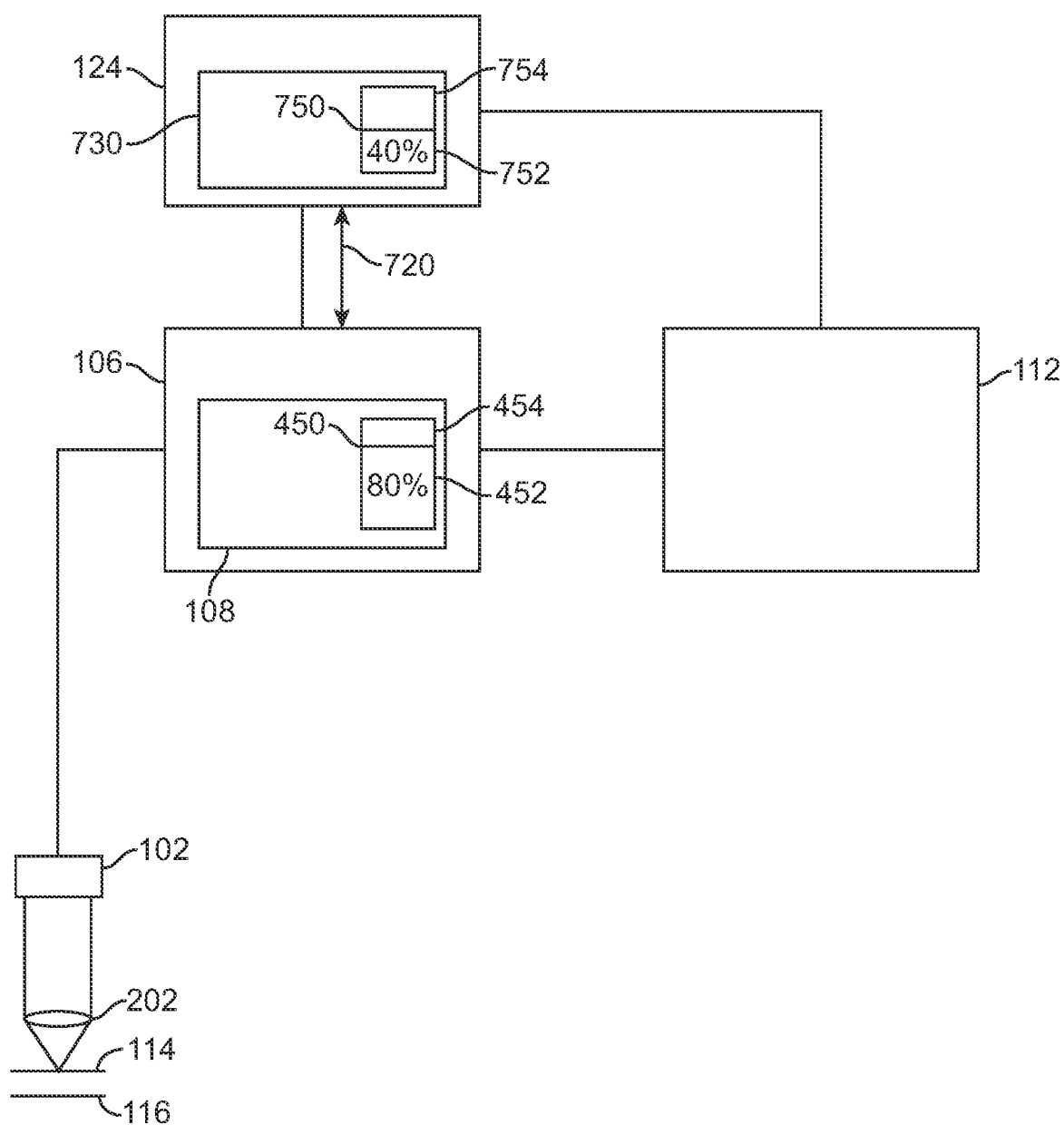
FIG. 7 is a diagrammatic representation of an exemplary microscope connected to a processor, a user device, and a remote server, in accordance with some embodiments.

FIG. 7 is a diagrammatic representation of an exemplary microscope 100 showing wired and/or wireless connections to processor 106, user device 112, and remote server 124. The microscope comprises image capture device 102, lens 202, and sample 114 mounted on stage 116, in accordance with some embodiments. Image capture device 102 may be configured to transfer images to processor 106. The microscope may be configured to receive instructions from processor 106 via a wired or wireless connection. The instructions may be user-selected and may include instructions to, for example, provide images collected under different illumination conditions (e.g., according to a predetermined pattern) or corresponding to a selected region of interest; provide or collect images at a particular zoom level, resolution, or magnification; transmit image data, etc. User-selected instructions may include instructions to suspend, abort, or alter the operation of the microscope at any time, including during image collection from sample 114 on microscope 100 or during construction of an image (e.g., a high resolution image) from a plurality of other images (e.g., low resolution images).

Processor 106 may be configured to receive images from image capture device 102. Processor 106 may also be configured to transmit instructions (e.g., instructions it is configured to receive) to microscope 100 (e.g., as described herein) or an element thereof, such as image capture device 102. Additionally, processor 106 may comprise memory 108 which is configured to store information such as image data. Memory 108 may be contained within or be physically separate from (e.g., connected physically or wirelessly to) processor 106. In some cases, memory 108 may be an external memory or comprise local cloud storage. Image data, e.g., stored in memory 108, may include complete microscope images (e.g., high resolution images) and partially completed microscope images 450 (e.g., partially completed high resolution images). The partially completed microscope image 450 may comprise a completed portion of the partially completed microscope image 452 and an incomplete portion of the partially completed microscope image 454, as described herein. The image data may include low resolution images and/or images captured under various illumination conditions in high or low resolution. Different illumination conditions may include, for example: different illumination angles, different illumination wavelengths, different illumination patterns, different illumination intensities, different illumination durations, different illumination positions, different image resolutions, and any combination thereof. Image data may also or alternatively include images captured at various stage positions corresponding to various regions-of-interest in exemplary sample 114, and/or images from multiple samples. Image data may also or alternatively include image data that has been segmented in pieces and data associated with tracking and managing those pieces, such as when using peer-to-peer file transfer protocol.

Processor 106 may be configured to receive and/or transmit image data 720 to remote server 124 via a wired or wireless connection. Processor 106 and/or remote server 124 may be configured to receive and/or transmit image data to user device 112 via a wired or wireless connection. Processor 106 may be configured to segment the image data into pieces to be received and/or transferred in real time, without ceasing image data collection from sample 114 on microscope 100. This may be implemented via a peer-to-peer network or any other protocol, which may enable microscope 100 to behave as a server, herein "microscope server". Processor 106 may be configured to construct images (e.g., high resolution images) from image data as image data is received, e.g., including during image collection from sample 114 on microscope 100. Processor 106 may receive and/or transfer image data during image data collection or image construction without ceasing image collection from the sample 114 on microscope 100. Similarly, processor 106 may receive and/or transfer image data during image data collection or image construction without ceasing another image construction process.

Processor 106 may be configured to receive instructions from user device 112 via a wired or wireless connection. The user-selected instructions received by the processor may include instructions common to the microscope including those that are configured to be transmitted to the microscope. The user-selected instructions may include, for example, different illumination conditions (such as a predetermined pattern of illumination conditions), instructions to an image (e.g., a high resolution image), selection of the region of interest, zoom level, magnification, instructions to receive image data, and/or instructions to transmit image data.

Remote server 124 may be configured to receive and/or transmit image data 720 to processor 106 via a wired or wireless connection. Remote server 124 may be configured to receive and/or transmit image data to user device 112 via a wired or wireless connection. Remote server 124 may be configured to store image data on a remote storage unit 730. The data stored by remote storage unit 124 may comprise the same types of data that processor 106 is configured to receive and/or transmit. Remote server 124 may be configured to receive data in real time in whole or in part, such as implemented by a peer-to-peer network. Remote server 124 and processor 106 may be peers in said network. Remote storage unit 730 may be configured to store any type or subset of types of data that processor 106 is configured to transmit in whole or in part. Remote server 124 may be configured to receive and/or transmit any type or subset of types of data which it is configured to store.

Remote server 124 may be configured to receive and/or transmit image data 720 in whole or in part. FIG. 7 shows a partially completed image (e.g., a partially completed high resolution image) which has been transmitted to a remote server 750. The partially completed image 750 which has been transmitted to remote server 124 may comprise the partially completed portion of the image 752 and the incomplete portion of the image 754. Because images can be transferred in whole or in part, the partially completed portion of the image 752 on remote server 124 may itself be a portion of the partially completed portion of the image on the processor 452. The partially completed portion 752 may comprise one or more images, such as one or more low resolution images. The partially completed portion 752 may be constructed or partially constructed (e.g., a high resolution image constructed or partially constructed from a plurality of low resolution images) or may comprise unprocessed images. Remote server 124 may be configured to construct images (e.g., high resolution images) from pieces of the segmented image data as they are received, including during image collection from sample 114 on microscope 100.

Remote server 124 may be configured to receive instructions from user device 112 via a wired or wireless connection. The user-selected instructions received by the remote server may include instructions common to the microscope including those that are configured to be transmitted to the microscope. The user-selected instructions may include, for example, instructions to collect or display images collected under one or more different zoom levels, magnifications, resolutions, or illumination conditions, including under a predetermined pattern of illumination conditions; to construct an image (e.g., a high resolution image); to select an image of the region of interest to view; to receive image data; and/or to transmit image data.

User device 112 may be configured to receive and/or transmit image data in whole or in part to processor 106 or to remote server 124 via a wired or wireless connection. User device 112 may be configured to receive and/or transmit image data to processor 106 via a wired or wireless connection. User device 112 may be configured to store image data on a storage unit included therein. User device 112 may be configured to store any type or subset of types of data that processor 106 is configured to transmit in whole or in part, including but not limited to image data. User device 112 may be configured to receive data in whole or in part, such as implemented by a peer-to-peer network, at any time, including during image collection from sample 114 on microscope 100. User device 112 may be configured to receive and/or transmit any type or subset of types of data which it is configured to store.

User device 112 may be configured to transmit instructions to control aspects of the operation of microscope 100 via processor 106 or remote server 124 including: collection of or display of images collected under different illumination conditions, including a predetermined pattern of illumination conditions; construction of images (such as high resolution images); selection of a region of interest, zoom level, magnification, resolution, etc. User device 112 may be configured to suspend, abort, or alter the operation of the microscope at any time, including during image collection from sample 114 on microscope 100. User device 112 may be configured to transmit instructions to transmit image data from processor 106 to remote server 124 or from processor 106 to remote server 124 via a wired or wireless connection at any time, including during image collection from sample 114 on microscope 100. User device 112 may be configured to transmit instructions to suspend, abort, or alter construction of the completed microscope image (e.g., a completed high resolution microscope image) on processor 106 or remote server 124 at any time, including during image collection from sample 114 on microscope 100.

Figure 8:
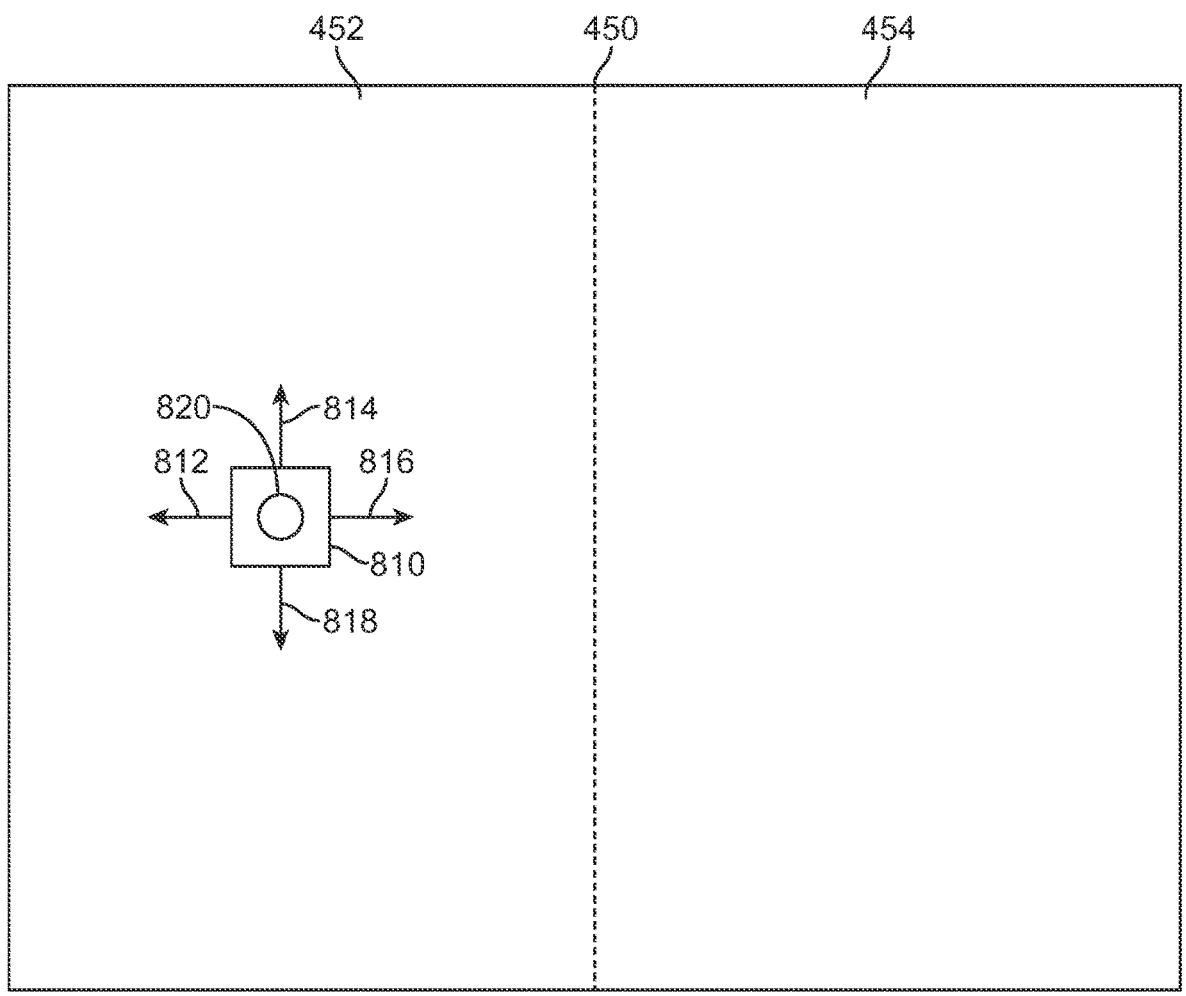
FIG. 8 is a schematic illustration of an exemplary incomplete image on a microscope server, in accordance with some embodiments.

FIG. 8 is a schematic illustration of an exemplary incomplete image on a microscope server, in accordance with some embodiments. The image data may include a partially completed microscope image 450 that may be a high resolution image. The partially completed microscope image 450 may comprise a complete portion of the partially completed image 452 and an incomplete portion of the partially completed image 454. The completed portion of the partially completed high resolution image 452 may contain a region of interest 810. The region of interest may contain a portion of sample 114 to be imaged including, for example, a cell 820. A user may move this region of interest in the up 814, down 818, left 812 or right 816 directions in the image display. A user may also provide instructions to processor 106 to move image capture device 102 or stage 116 to affect movement of sample 114 in order to collect additional images of region of interest 810, e.g., for use in constructing an image (such as a high resolution image) corresponding to region of interest 810. The exemplary images on a microscope server in FIG. 8 may be transferred in whole or in part to remote server 124 or to user device 112.

Figure 9:
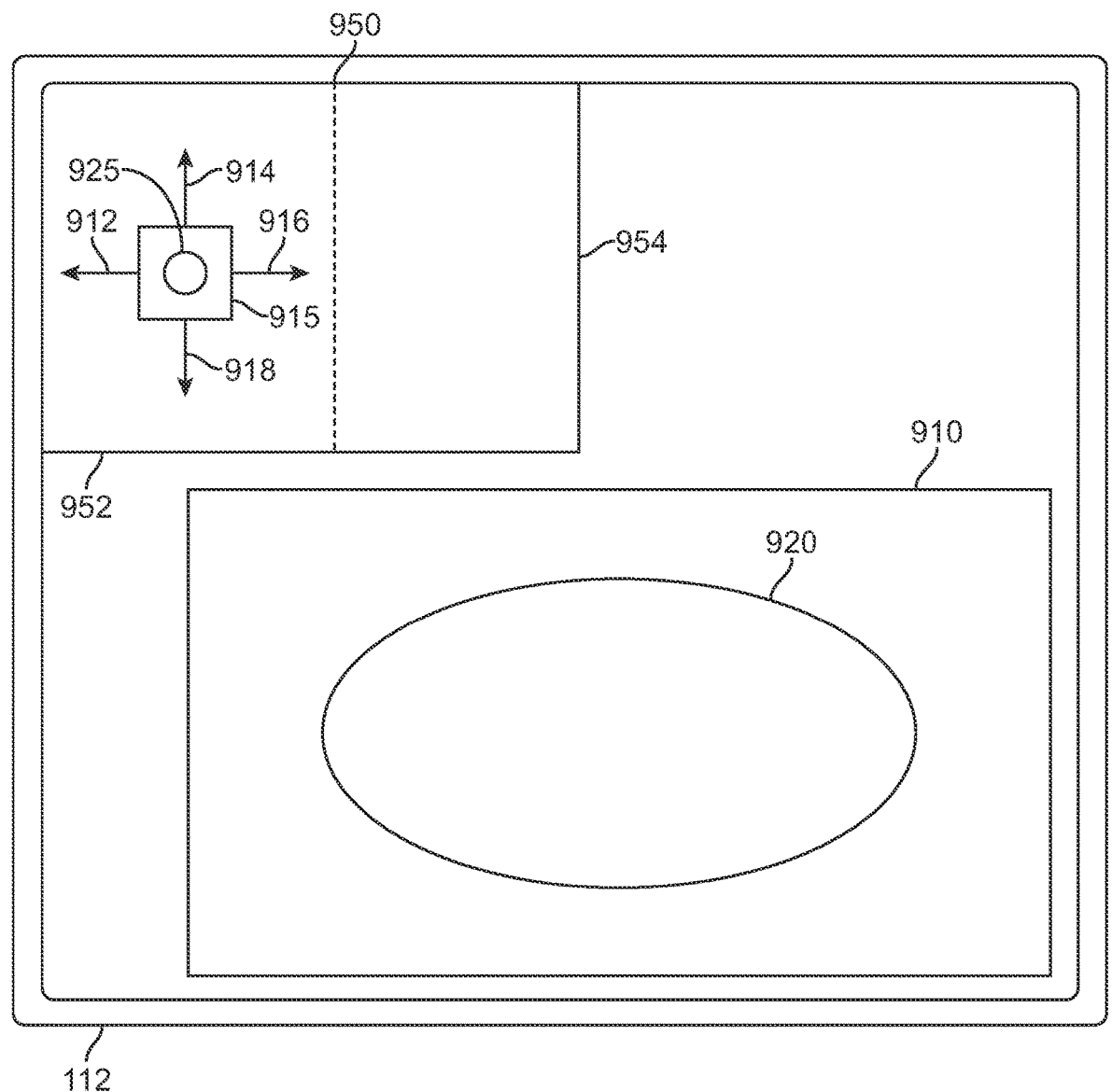
FIG. 9 is a schematic illustration of a remote user device showing a region of interest remotely selected by a user and a high resolution image of the user-selected region of interest.

FIG. 9 is a schematic illustration of a remote user device 112 showing a low resolution image 950 of a partially completed high resolution image. The low resolution partially completed image may include a completed portion of the partially completed high resolution image 952 and an incomplete portion of the partially completed high resolution image 954. Depending on the fraction of image data that has been previously transferred from the microscope server, the completed portion of the partially completed high resolution image 952 on a remote user device may be itself a partially completed portion of the partially completed portion of the high resolution image on the microscope server 452.

By way of example, a remote user may observe a view of low resolution image 950 of an already constructed region of sample 114. The user may decide to initiate a request to view a high resolution image of a region of interest 915 of the partially completed portion 952 of the region. The region of interest may contain a portion of sample 114 including, for example, a cell 925. This region of interest can be moved in the up 914, down 918, left 912, or right 916 directions. If the image data corresponding to the high resolution image 910 is located on remote server 124 or processor 106, instructions may be sent to transmit that data to user device 112. User device 112 may then display a high resolution image 910 of user-selected region of interest 915, and the user may observe a portion of the sample including, for example, a cell 920 at high resolution.

In another example, a remote user may observe a view of low resolution image 950 of a region of sample 114 that has yet to be constructed. The user device 112 may then issue instructions to processor 106 or remote server 124 to construct a high resolution image based upon low resolution image 950 and, optionally, additional low resolution images. The user device 112 may then issue instructions to transmit the constructed high resolution image to display on user device 112.

In a third example, a remote user may view low resolution image 950 of a region of sample 114 that has not been imaged to the satisfaction of the user or for which a corresponding high resolution image has not been constructed. User device 112 may then transmit instructions to processor 106 to change one or more aspects of the operation of microscope 100 including: the illumination conditions under which images are collected or displayed, the selection of the region of interest to image, and/or the selection of the zoom level, magnification, and resolution under which images are collected or displayed. The user device 112 may, simultaneously or at a later point in time, transmit instructions to the microscope server to transmit the image data to processor 106 or remote server 124. The user device 112 may, simultaneously or at a later point in time, transmit instructions to processor 106 or remote server 124 to construct a high resolution image. The user device 112 may, simultaneously or at a later time, transmit instructions to transmit the constructed high resolution image for display on user device 112. Similarly, a remote user may view a low resolution image of a region of a sample that has been fully imaged, constructed, and stored previously. The user device 112 may transmit instructions to processor 106 or remote server 112 to transmit only the desired region of the constructed high resolution image to display on user device 112.

In a fourth example, a remote user may view a medium or high resolution image 915 of a region of interest sample 114 and decide to initiate a request to view a medium or high resolution image of a second region of interest of the partially completed high resolution image 952 or the incomplete portion of the partially completed high resolution image 954. The second region of interest may be contained within the first region of interest corresponding to image 915 and be accessible by zooming in or out on image 950. Alternatively, the second region of interest may be overlapping or non-overlapping with the first region of interest corresponding to image 915 and may be accessible by moving in up, down, left, right, or a combination of these directions and may optionally further require zooming in or out on image 950. In some cases, the user may select to view a region of interest separate from image 915 by, for example, selecting the region from image 950 using a selection tool. This action may cause the display on user display 112 to "jump" from one image to another.

A system which performs streaming without having the entire file stored in a remote memory may be delayed by upload times in certain cases. One feature that may be implemented to improve the system response time is to preconfigure the system to, in certain cases, send images of adjacent regions to the ones the user requested or viewed without waiting for a request (these images may be of one or more zoom levels and of different sized regions), this capability may be useful in preventing delays if the user moves by panning across the screen or zooming in or out.

Figure 10:
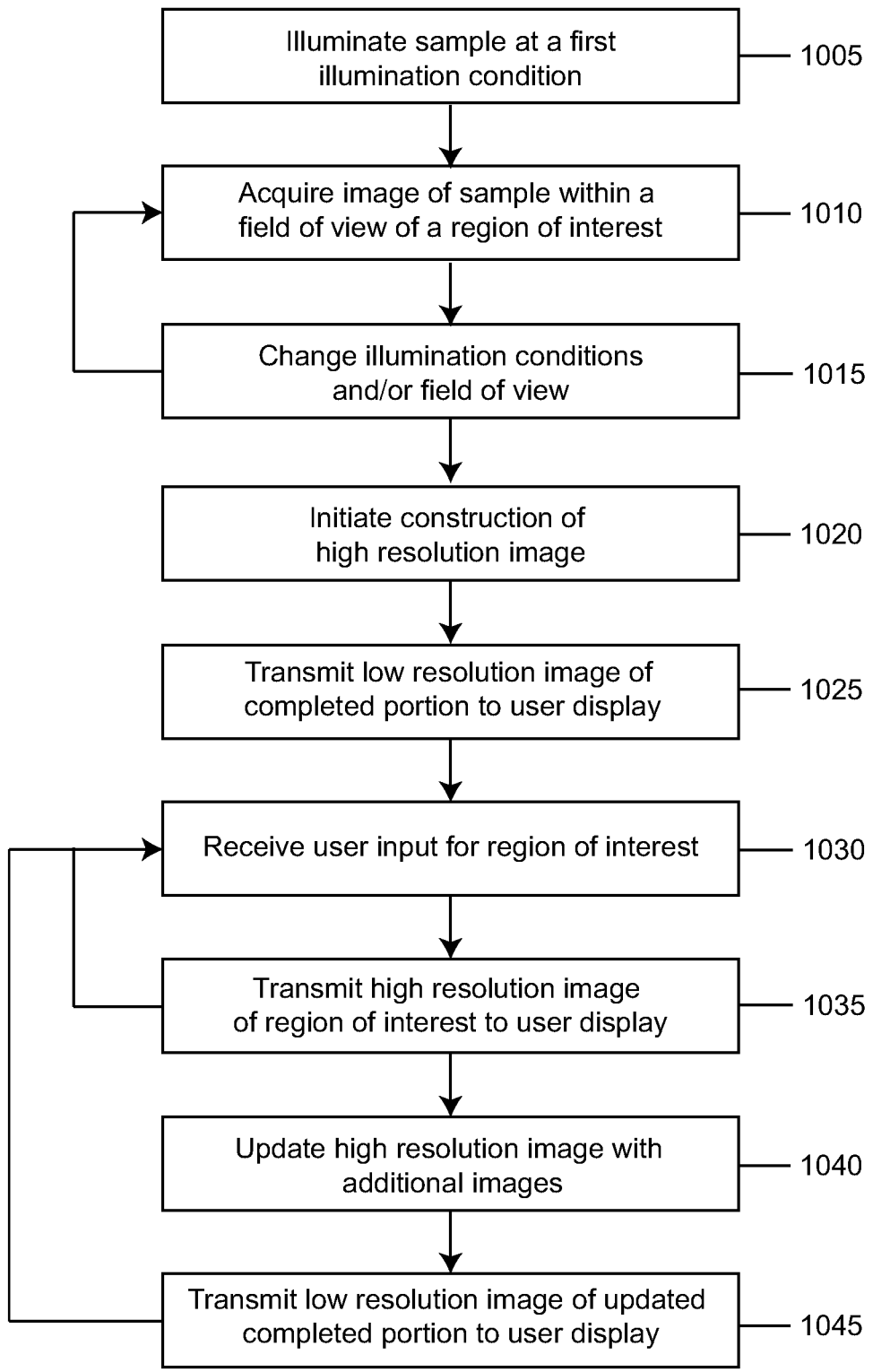
FIG. 10 is a flowchart showing an exemplary process for acquiring images, constructing high resolution images, and transmitting images in communication with a user device and a remote server, in accordance with some embodiments.

FIG. 10 shows a method 1000 of accessing partially completed high resolution images in accordance with some embodiments. At a step 1005, the sample is illuminated as described herein. At a step 1010, an image of the sample within the field of view of the microscope is acquired as described herein. At a step 1015 the illumination condition and/or field of view is changed as described herein. As shown, steps 1010 and 1015 can be repeated as necessary, as described herein. At a step 1020, construction of a high resolution image is initiated, as described herein. At a step 1025, a low resolution image of the completed portion of the high resolution image is transmitted to user display 112, as described herein. At a step 1030, user input for a region of interest is received, as described herein. At a step 1035, a completed portion of a high resolution image corresponding to the user-selected region of interest is transmitted, as described herein. As shown, steps 1030 and 1035 can be repeated as specified by the user, as described herein. At a step 1040, the high resolution image is updated with additional images from steps 1010 and 1015. For example, all or a portion of a completed microscope image may be updated or appended by additional images collected by the microscope system. In some cases, a user may provide instructions to processor 106 to supplement or supplant image collection in a region of interest, as described herein. Correspondingly, an ongoing image construction process may be suspended, aborted, or altered upon receipt of the user's instructions. In some examples, a partially completed high resolution image or a portion thereof may be replaced by an image constructed based on additional images from steps 1010 and 1015. In some embodiments, a completed portion of a microscope image is updated in response to image data from image capture device 102 so as to generate a plurality of successively completed portions of the microscope image over time. At a step 1045, a low resolution image of an updated completed portion of a high resolution image corresponding to the user-selected region of interest is transmitted to user display 112, as described herein. As shown, steps 1035, 1040 and 1045 are optionally repeated, as described herein. Subsequent to step 1045, a user may view the low resolution image and provide instructions to the system to, for example, collect additional images or perform additional computation processes. The partially completed high resolution image may be transmitted to a remote server, as described herein.

While FIG. 10 shows a method of accessing partially completed high resolution image data in accordance with some embodiments, a person of ordinary skill in the art will recognize many adaptations and variations. For example, a similar method may be used to access partially completed images other than high resolution images (e.g., the result of combining or "stitching together" images or producing lower resolution versions of an image or a portion thereof (such as a "pyramid" of images) in accordance with some embodiments. As described herein, both completed and partially completed images, as well as unprocessed images, can be transmitted to a remote server 124 and/or a user display 112. Further, one or more steps shown in FIG. 10 may be deleted or repeated, additional steps can be added, and the steps can be performed in any order.

In some embodiments, an image which may be part of the microscope image and even a small part of it is transferred to user display 112 via a network server. This network server may not have the completed microscope image stored in its memory when the image is transferred to user display 112. The microscope systems described herein may provide an image link through which users can access one or more microscope images. In some embodiments, processor 106 is configured to carry out instructions to allow a user to access a microscope image through an image link. The image link may remain valid even when the microscope image is transferred between a memory connected to or otherwise associated with processor 106 (e.g., local storage) and a memory of user display 112 or of a network server (e.g., image data may be transferred from local storage to a cloud storage system or other form of remote storage). Processor 106 may further be configured to allow the user to access one or more completed portions of an image prior to the completion of an image construction process. The image link may be an internet URL/IP or a link or address inside a dedicated system. In some cases, a link may include, for example, a thumbnail that leads to the image and/or a pointing or selection device.

In some embodiments, processor 106 is configured with instructions for users to provide annotations to an image. For example, a user may provide an annotation of a completed microscope image or a partially completed microscope image. Processor 106 may be configured with instructions for a local or a remote user to view the annotations of the relevant image. Annotations may be provided to or by a local or remote user, and may be viewed by a local or remote user prior to, for example, completion of a computation process such as construction of a microscope image.

Computer Control Systems

Figure 11:
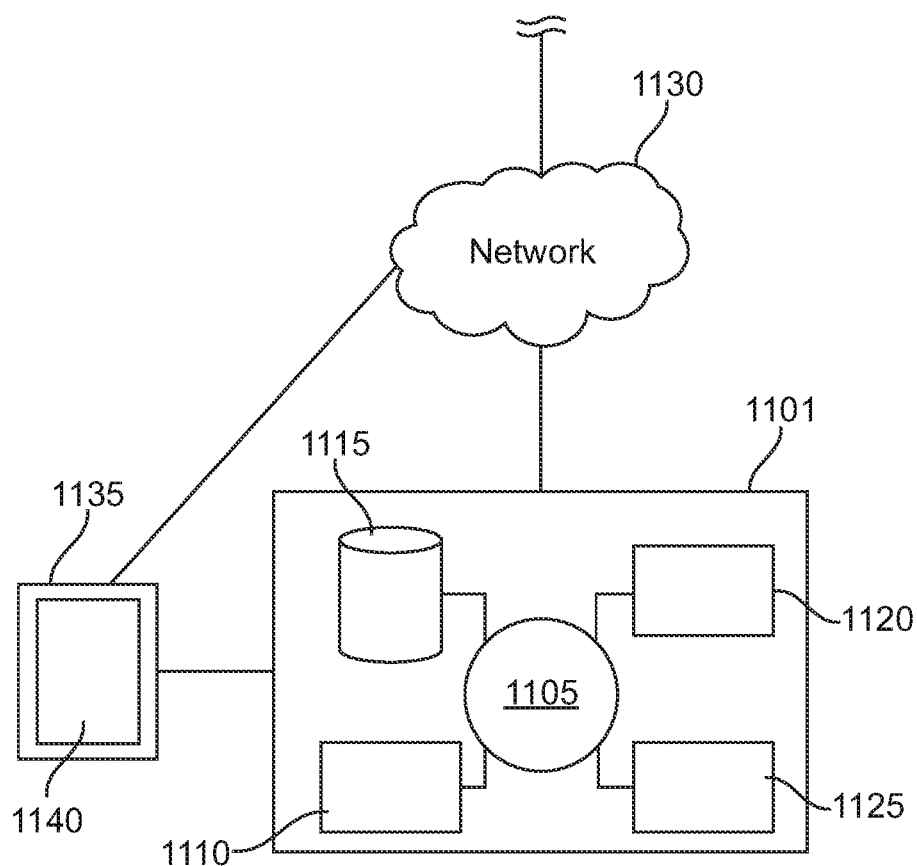
FIG. 11 shows a computer control system that is programmed or otherwise configured to implement systems provided herein.

The present disclosure provides computer control systems that are programmed to implement methods of the disclosure. FIG. 11 shows an exemplary computer system, i.e., computing device or computer 1101 that is programmed or otherwise configured to control the operation of microscope 100 in accordance with some embodiments. The computer system 1101 can regulate various aspects of the microscope 100, such as, for example, processing and/or analysis of image data, storing of image and/or operational data, control of the motors, control of the illumination conditions, prioritization of tasks, preforming calculations, transfer of image data, etc. The computer system 1101 can include or be component of an electronic device of a user, such as user device 112, or a computer system that is remotely located with respect to the electronic device, such as remote server 124. The computer system 1101 can include or be a component of a local computing device, such as processor 106. In some embodiments, microscope 100 including the processor 106 can be housed inside one microscope housing, connected housings, or housings located in proximity to one another to allow for intranet or direct connection. The electronic device can be a mobile electronic device.

The computer system 1101 includes a central processing unit (CPU, also "computer processor" herein) 1105, which can be a single core or multi core computer processor, or a plurality of computer processors for parallel processing or include a graphics processing unit (GPU, also "graphics processor" herein) or a plurality of graphics processors. The computer system 1101 also includes memory or memory location 1110 (e.g., random-access memory, read-only memory, flash memory), electronic storage unit 1115 (e.g., hard disk, SSD), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. In some embodiments, the storage unit 1115 can be located on processor 106, for example as memory 108. In other embodiments, the storage unit 1115 can be located on remote server 124, for example as remote storage unit 730. The computer system 1101 can be operatively coupled to a computer network ("network") 1130 with the aid of the communication interface 1120. The network 1130 can be the Internet, an internet and/or extranet, or an intranet and/or extranet that is in communication with the Internet or enclosed. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server, such as remote server 124.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on remote server 124 that is in communication with processor 106 through an intranet or the Internet, e.g., remote storage unit 730.

The computer system 1101 can communicate with one or more remote computer systems through the network 1130. For instance, the computer system 1101 can communicate with a remote computer system of a user, such as user device 112 or remote server 124. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by CPU 1105. In some cases, the code can be retrieved from the storage unit 1115 and stored on the memory 1110 for ready access by CPU 1105. In some situations, the electronic storage unit 1115 can be precluded, and machine-executable instructions are stored on memory 1110.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or computer processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, computer processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or computer processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a computer processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a computer processor for execution.

The computer system 1101 can include or be in communication with an electronic display 1135 that comprises a user interface (UI) 1140. Examples of UI's include, without limitation, a graphical user interface (GUI) and web-based user interface. In some cases, electronic display 1135 may be connected to the computer system 1101 via a network, e.g., via network 1130.

Methods and systems of the present disclosure can be implemented by way of one or more algorithms. An algorithm can be implemented by way of software upon execution by the central processing unit 1105. The algorithm can, for example, construct a high resolution image, collect images according to user-determined instructions, receive or transmit data to one or more computer systems, etc.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A microscope comprising:
   an optical apparatus;
   an imaging device operatively coupled to the optical apparatus;
   a processor; and
   a non-transitory computer readable storage medium comprising instructions configured to cause the processor to:
   (a) transmit a first image to a display visible to a user, the first image corresponding to a first portion of an image of a sample;
   (b) receive input from the user corresponding to a processing instruction, an imaging instruction, or an uploading instruction;
   (c) reorganize a queue of image processing instructions, imaging instructions, or uploading instructions for the image based on the input from the user;
   (d) generate a second image using the imaging device and the optical apparatus or upload a second image using the processor based on the queue as reorganized in (c), wherein the second image corresponds to a second portion of the image; and
   (e) transmit an updated portion of the image in response to the queue of the image processing instructions, imaging instructions, or uploading instructions as reorganized in (c) to the display visible to the user.

2. The microscope of claim 1, wherein the processing instruction, the imaging instruction, or the uploading instruction corresponds to a portion of the first image.

3. The microscope of claim 1, wherein the processing instruction, the imaging instruction, or the uploading instruction comprises a region of the updated portion not fully shown in the first image.

4. The microscope of claim 1, wherein the first image comprises a low resolution image.

5. The microscope of claim 1, wherein the updated portion of the image comprises a resolution higher than the first image and optionally wherein the resolution of the updated portion of the image is higher than the first image and is within a range from about 2 times to about 100 times the resolution of the first image.

6. The microscope of claim 1, wherein the input corresponding to the processing instruction, the imaging instruction, or the uploading instruction further comprises input corresponding to a user-selected zoom level, magnification, resolution, color scheme, contrast, or brightness.

7. The microscope of claim 1, wherein the updated portion corresponds to an entire pre-defined area of the sample.

8. The microscope of claim 1, wherein the microscope comprises a computational microscope and optionally wherein the computational microscope is configured to illuminate the sample with a plurality of illumination conditions to capture a plurality of images and generate a portion of the updated portion of the image of the sample based on the plurality of images and optionally wherein the portion of the updated portion of the image of the sample corresponds to a field of view of the optical apparatus and the imaging device.

9. The microscope of claim 1, wherein the first image and the updated portion of the image are transferred to the display visible to the user via a network server, which network server does not have the updated portion of the image of the sample stored in its non-transitory computer readable storage medium when the first image and the updated portion of the image are transferred to the display.

10. The microscope of claim 9, wherein the updated portion of the image of the sample comprises an image of a part of the sample defined to be scanned with the instructions stored on the non-transitory computer readable storage medium.

11. The microscope of claim 1, wherein the instructions are configured to allow the user to access the image of the sample through a link which remains valid even when the image of the sample is transferred between the non-transitory computer readable storage medium of the processor and a non-transitory computer readable storage medium of a network server and optionally wherein the instructions are configured to allow the user to access the updated portion of the image of the sample prior to completion and optionally wherein the link comprises an internet uniform resource locator (URL) or internet protocol (IP) address.

12. The microscope of claim 11, wherein the link provides the first image using a dedicated system resource and allows the user to select the processing instruction, the imaging instruction, or the uploading instruction in response to the first image and wherein the non transitory computer readable storage medium comprises instructions configured to cause the processor to transmit the updated portion of the image without transferring all of the image of the sample and optionally wherein the user input points to a location of the updated portion of the image of the sample and optionally wherein the first image comprises a thumbnail of the updated portion of the image of the sample.

13. The microscope of claim 1, wherein the non-transitory computer readable storage medium comprises instructions configured to cause the processor to enable local and remote users to provide annotations to the updated portion and wherein the non-transitory computer readable storage medium comprises instructions configured to cause the processor to enable the local and remote users to view the annotations to the updated portion of the image of the sample and optionally wherein the non-transitory computer readable storage medium is configured to allow the local and remote users to provide and view the annotations prior to completion of the image of the sample.

14. The microscope of claim 1, wherein the image of the sample comprises a high resolution image of the sample based on low resolution images captured using different illumination conditions, wherein the different illumination conditions are selected from the group consisting of different illumination angles, different illumination wavelengths, different illumination patterns, different illumination durations, different illumination intensities, and different illumination positions.

15. The microscope of claim 1, wherein the processor is configured with instructions to receive image data from the microscope and construct the updated portion of the image of the sample.

16. The microscope of claim 1, wherein the non-transitory computer readable storage medium comprises instructions configured to cause the processor to:
   receive a plurality of inputs corresponding to a plurality of user-selected regions of interest of the updated portion of a partially completed high resolution image of the sample; and
   transmit a plurality of high resolution images of the plurality of user-selected regions of interest.

17. The microscope of claim 1, wherein the non-transitory computer readable storage medium comprises instructions configured to cause the processor to:
   update the updated portion of the image of the sample in response to image data from the imaging device so as to generate a plurality of successively updated portions of the image of the sample over time;

transmit a plurality of successive first images of the plurality of successively updated portions to the display visible to the user;

receive a plurality of successive user inputs corresponding to a plurality of successive processing instructions, imaging instructions, or uploading instructions from the plurality of successive first images;

reorganize a queue of image processing instructions, imaging instructions, or uploading instructions for the image based on the input from the user;

generate a plurality of successive second images using the imaging device and the optical apparatus or upload a plurality of second images using the processor based on the queue, wherein the plurality of second images correspond to at least a second portion of the image; and transmit to the display the plurality of successive second images and optionally wherein the plurality of successive first images is transmitted over time and the plurality of successive second images is transmitted over time.

18. The microscope of claim 1, wherein the non-transitory computer readable storage medium comprises instructions configured to cause the processor to:

update the updated portion in response to image data from the imaging device so as to generate a plurality of successively completed portions of the image of the sample over time;

transmit a plurality of successive low resolution images of the plurality of successively completed portions to the display visible to the user;

receive a plurality of successive user inputs corresponding to a plurality of successive processing instructions, imaging instructions, or uploading instructions from the plurality of successive low resolution images; and transmit to the display a plurality of successive high resolution images of the plurality of successive processing instructions, imaging instructions, or uploading instructions and optionally wherein the plurality of successive low resolution images is transmitted over time and the plurality of successive high resolution images is transmitted over time.

19. The microscope of claim 1, wherein the updated portion is transmitted to the display visible to the user over a network.

20. The microscope of claim 1, wherein the optical apparatus is selected from the group consisting of a microscope, a computational microscope, and a holographic imaging apparatus and wherein the imaging device comprises an image sensor selected from the group consisting of a semiconductor charge-coupled device (CCD), active pixel sensors, active pixel sensors in complementary metal-oxide-semiconductor (CMOS), and N-type metal-oxide-semiconductor (NMOS) sensors.

* * * * *